(12) United States Patent
VanDenberg et al.

(10) Patent No.: US 9,039,034 B2
(45) Date of Patent: May 26, 2015

(54) MULTIPLE AXLE EQUALIZING RUBBER SUSPENSION

(71) Applicant: Transportation Technologies, Inc., Massillon, OH (US)

(72) Inventors: Ervin K. VanDenberg, Massillon, OH (US); David H. Croston, Navarre, OH (US); Michael K. Powers, Marshallville, OH (US)

(73) Assignee: Transportation Technologies, Inc., Massillon, OH (US)

( * ) Notice: Subject to any disclaimer, the term of this patent is extended or adjusted under 35 U.S.C. 154(b) by 0 days.

(21) Appl. No.: 13/913,582

(22) Filed: Jun. 10, 2013

(65) Prior Publication Data

US 2014/0225351 A1    Aug. 14, 2014

Related U.S. Application Data

(63) Continuation of application No. 13/765,736, filed on Feb. 13, 2013.

(51) Int. Cl.
| | |
|---|---|
| *B60G 5/04* | (2006.01) |
| *B60G 11/18* | (2006.01) |
| *B60G 11/22* | (2006.01) |

(52) U.S. Cl.
CPC ...... *B60G 5/04* (2013.01); *B60G 11/18* (2013.01); *B60G 11/225* (2013.01); *B60G 2300/04* (2013.01)

(58) Field of Classification Search
CPC .... B60G 5/04; B60G 2300/04; B60G 11/183; B60G 11/23; B60G 21/045; B60G 21/04

USPC ............ 280/679, 124.166, 684, 124.169
See application file for complete search history.

(56) References Cited

U.S. PATENT DOCUMENTS

| | | | |
|---|---|---|---|
| 2,410,747 A * | 11/1946 | Reid ....................... 280/684 |
| 2,998,981 A | 9/1961 | Derr | |
| 3,271,046 A * | 9/1966 | Evans et al. ............ 280/684 |
| 3,606,373 A * | 9/1971 | Knott et al. ............. 280/684 |
| 3,737,173 A * | 6/1973 | Boissier et al. .......... 280/684 |
| 3,784,221 A | 1/1974 | Frasier, Sr. | |
| 5,161,814 A | 11/1992 | Walker | |
| 5,163,701 A | 11/1992 | Cromley, Jr. | |
| 5,427,404 A | 6/1995 | Stephens | |
| 5,820,156 A | 10/1998 | VanDenberg | |
| 6,340,165 B1 | 1/2002 | Kelderman | |
| 7,758,056 B2 | 7/2010 | VanDenberg et al. | |
| 8,641,079 B2 * | 2/2014 | Dunlap et al. ........... 280/684 |
| 2005/0151339 A1 * | 7/2005 | Carty ..................... 280/124.169 |

* cited by examiner

*Primary Examiner* — Ruth Ilan
(74) *Attorney, Agent, or Firm* — Sand & Sebolt

(57) ABSTRACT

A suspension system for a vehicle includes a frame mounting bracket for mounting to the vehicle. The suspension includes front and rear rubber torsion axle assemblies. Front and rear lever assemblies are respectively pivotally attached to the vehicle at front and rear lever pivot points. Outer housings of the rubber torsion axle assemblies are each respectively rigidly mounted to the front and rear lever assemblies. A rigid control arm is pivotally connected at one end to the front lever assembly at a front control arm pivot point and its other end is pivotally connected to the rear lever assembly at a rear control arm pivot point. When the suspension assembly encounters a force causing the front lever assembly to rotate in one direction about the front lever pivot point the rigid control arm causes the rear lever assembly to rotate about the rear lever pivot in an opposite direction.

16 Claims, 29 Drawing Sheets

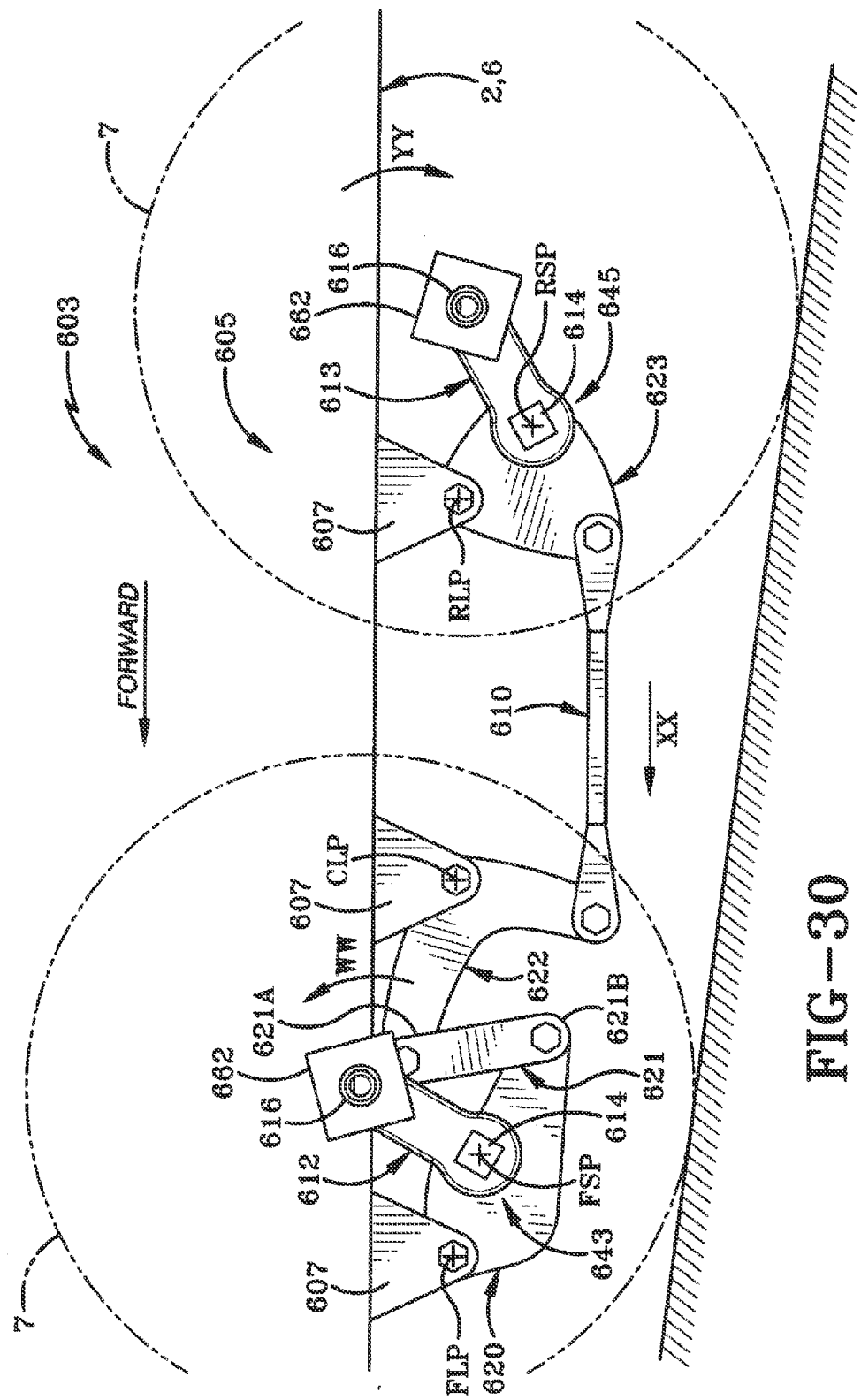

MULTIPLE AXLE EQUALIZING RUBBER SUSPENSION

CROSS REFERENCE TO RELATED APPLICATION

This application claims priority from U.S. patent application Ser. No. 13/765,736, filed Feb. 13, 2013; the disclosure of which is incorporated herein by reference.

BACKGROUND

1. Technical Field

The invention relates to suspension methods and systems for vehicles such as trailers and trucks. More particularly, the invention relates to a suspension system using two or more rubber torsion axle assemblies that operate together. Specifically, the invention relates to a torsion axle assembly being linked to a second torsion axle assembly to improve axle-to-axle load equalization and provide for a softer ride.

2. Background Information

Torsion axles have been known for many years such as those shown in U.S. Pat. No. 2,998,981 for example. Torsion axles have proven to be extremely popular because if one wheel hits a bump or rut it can react independently of the other wheel which may not have hit a bump or rut at the same time. This torsion axle concept operates to keep a trailer moving as straight as possible while being towed behind a vehicle as well as absorbing some of the shock of the road over which it is passing with an independent suspension. This is contrasted with a straight axle where if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Torsion axles are constructed of a square axle in cross section with elongated rubber members disposed in-between the square axle and a larger outer tube. U.S. Pat. Nos. 5,161,814 and 5,820,156 disclose such a construction. One common torsion axle is a TorFlex® rubber torsion suspension system distributed by Dexter Axle. This type of torsion axle has independent and separate stub axles on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after such twisting and bending. it is also known to use air bags for straight, non-torsion axles, such as shown in U.S. Pat. Nos. 3,784,221 and 5,427,404. While it is true that both the torsion axle technology and the air bag technology has been quite successful independently in making a smoother ride and enhanced the handling performances of vehicles having such suspension systems, these suspension systems still have their shortcomings and there is a need for improvement within the art.

Further, the vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring. U.S. Pat. No. 7,758,056 improves on the system of U.S. Pat. No. 6,340,165 by providing a more rugged and compact structure by combining the pivot for both the torsion axle and connected spindle swing arm and the air spring mounting arm on a common axis. However, the spindle of the suspension of U.S. Pat. No. 7,758,056 rides at load position where the torsion axle is already partly compressed limiting the range of motion available of the spindle with respect to a no-load position. Also, when two or more torsion axle assemblies without any air suspension components are used in a suspension system there is no equalization of loads between the two or more torsion axle assemblies. Therefore, a better suspension system is needed.

BRIEF SUMMARY OF THE INVENTION

The preferred embodiment of the invention is a suspension system for a vehicle/trailer. The suspension system for a vehicle includes a frame mounting bracket for mounting to the vehicle. First and second levers are pivotally mounted to the frame mounting bracket. First and second rubber torsion axle assemblies are rigidly mounted to the first and second levers respectively. A control arm pivotally connects between the first lever and the second lever. Spindle swing arms are attached to the first and second torsion axle assemblies. The control arm and the first and second levers are configured to rotate the first rubber torsion axle assembly and the second rubber torsion axle assembly simultaneously when a dynamic force is encountered by the suspension assembly. This is because when a load is encountered, one of the spindle swing arms will deflect up or down to begin turning a corresponding central torsion axle shaft. In response to this, rubber springs in that torsion axle will begin to compress to eventually rotate the torsion axle assembly and through the levers and the control arm it will also react and absorb the same loads as those experience by the first axle swing arm. As will be described in more detail later in the detailed description, this reduces the spring rate to theoretically half that of a single axle absorbing the load alone. The preferred embodiment of the suspension assembly with a reduced spring rate provides for a better ride and a rubber torsion system that has a wider range of motion and by preventing single axle overloads will have a longer life.

In some configurations, the first spindle swing arm extends forward of the first lever with respect to a direction the vehicle normally travels forward in. The second swing arm trails the second lever. This is known as a "push-pull" configuration. In another configuration, both spindles swing arms and their associated levers extend rearward and the pivots are on the forward side of the rubber torsion axles. This is known as a "pull-pull" configuration. The "pull-pull" configuration requires the use of some type of motion reversing mechanism such as a ball crank or gear segments to be utilized to provide the required kinematic motion of the axles in the system. With both configurations when a bump is encountered by the one axle of this suspension system, one axle's spindle swing arms rise while the swing arms of the other axle move downward. The "push-pull" configuration is brake reactive so that when the brakes are applied the vertical loads on the two axles are different because of the force resulting from the brake application. The "pull-pull" configuration is not brake reactive and the vertical loads on the two axles are not different during braking.

In some configurations, the first lever is at least partially triangularly-shaped with three endpoints. The swing arm pivot point, the frame mounting bracket pivot point and the control arm pivot point are each located near a different endpoint. A spindle rod is connected to the spindle swing arm and a wheel assembly can be connected to this spindle rod. When the wheel encounters a force, the first rubber torsion axle assembly reacts to absorb at least some of the force and motion. Nearly simultaneously, the second rubber torsion axle assembly acts in series with the first rubber torsion axle assembly to react and absorb at least some of the force and deflection imposed on the system. The first lever and second levers are configured to rotate the first rubber torsion axle assembly and the second rubber torsion axle assembly in response to the first rubber torsion axle assembly reacting to absorb at least some of the force.

Another configuration of the preferred embodiment includes a third rubber torsion axle assembly rigidly mounted to the frame mounting bracket between the first rubber torsion axle assembly and the second rubber torsion axle assembly. This centrally located torsion axle is not connected to any lever device or the control arm but because of its central location and vertical position carries loads equal to the loads on the front and rear axles which are interconnected to equalize wheel loads.

Another configuration of the preferred embodiment includes first and second levers, first and second springs, and first and second spindle swing arms. The first lever is pivotally connected to the frame of a vehicle at a first frame pivot axis. The first spindle swing arm is connected to the first spring at a first spindle pivot axis. The second lever is pivotally connected to the frame of a vehicle at a second frame pivot axis. The second spindle swing arm is connected to the second spring at a second spindle pivot axis. The control arm is pivotally connected to the first and second levers respectively and is configured to rotate the first spring about the first frame pivot axis while simultaneously rotating the second spring about the second frame pivot axis.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 30 illustrates the third example "pull-pull" suspension of FIG. 22 climbing a hill.

Similar numbers refer to similar parts throughout the drawings.

DETAILED DESCRIPTION OF THE INVENTION

Figure 1:
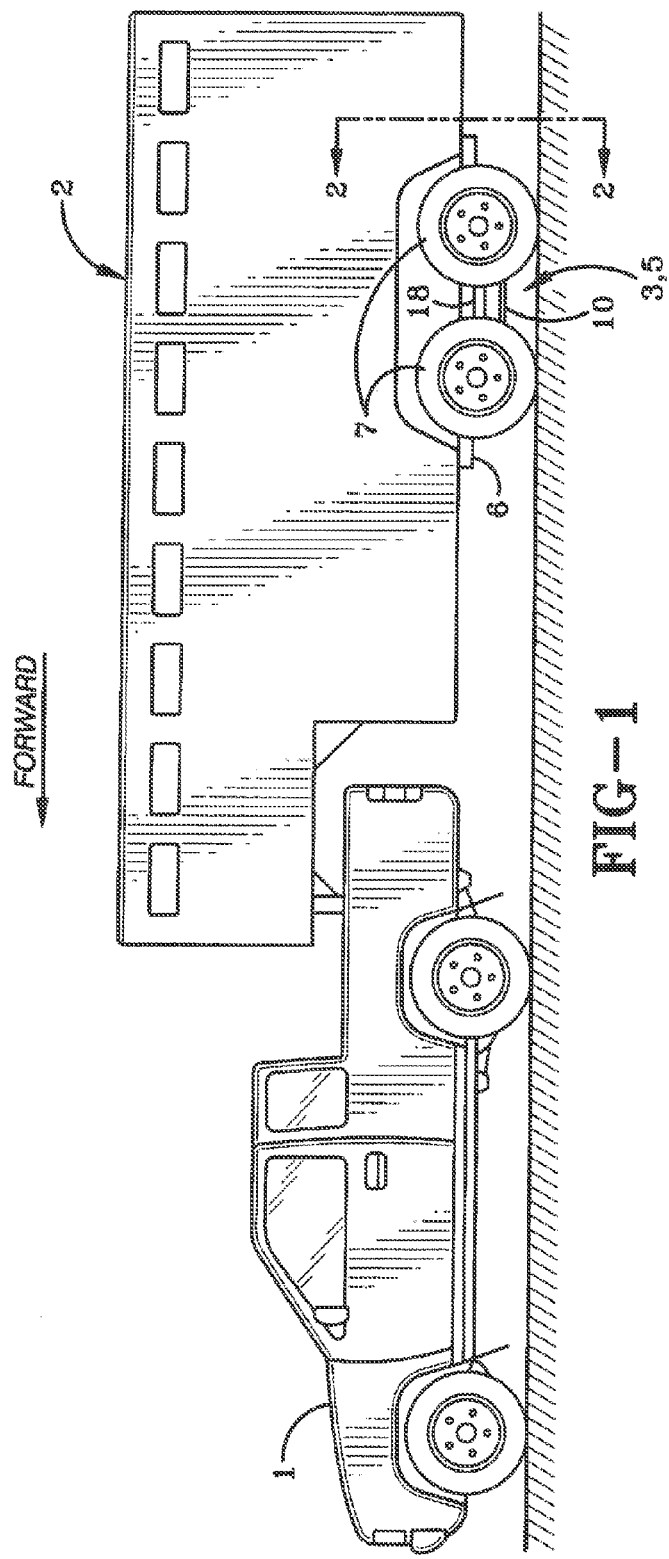
FIG. 1 is an example diagrammatic side elevational view of a truck and a trailer on which the improved suspension assembly is mounted.
Figure 2:
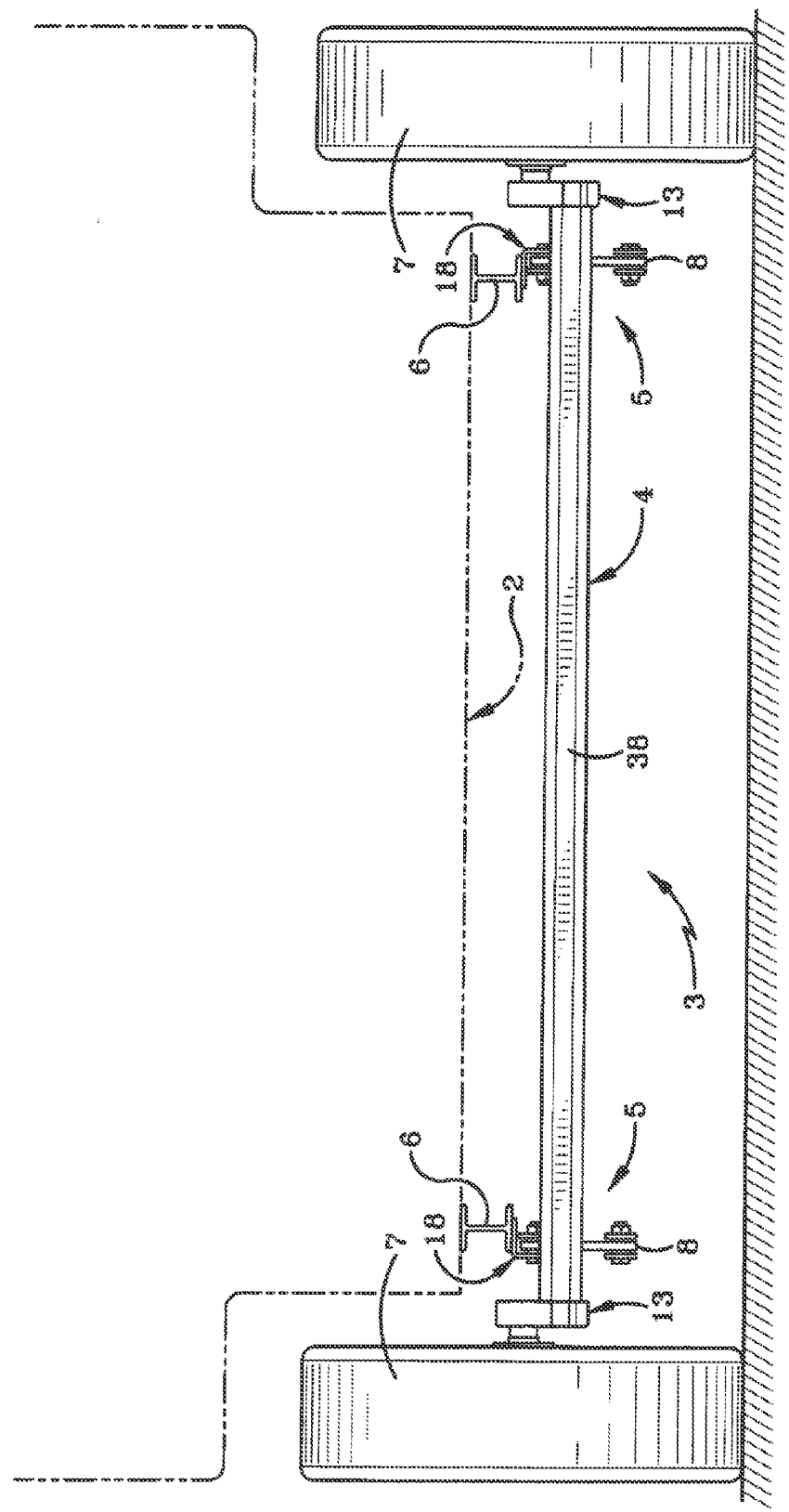
FIG. 2 is an example rear elevational view of a pair of the improved suspension assemblies mounted on a trailer shown in dot dashed lines.

FIG. 1 illustrates an example midsized trailer 2 that is pulled by a truck 1. The preferred embodiment of a vehicle suspension system indicated generally at 3 is mounted to the trailer 2 and is used to equalize loads on both axles and soften the force encountered by its wheels 7. The suspension system 3 can be mounted to other trailers of different sizes and in some configurations might even be mounted to a frame rail 6 of the trailer 2 or directly to a truck 1 itself as FIG. 1 merely illustrates one example of where the suspension system 3 is used and does not limit other potential uses.

Before describing the preferred embodiment of the suspension system 3 in detail, the following are briefly discussed: first, a paragraph introduces a preferred embodiment of an improved new suspension assembly 5 (FIG. 3) that includes two torsion axle assemblies 4, two levers 8 and a control arm 10; secondly, a paragraph discusses the benefits of a suspension assembly 5 with the two levers 8 and a control arm 10; and finally, a paragraph discusses a configuration of the suspension assembly that has the spindle swing arms both face a similar rearward position in a "pull-pull" orientation that is different than a "push-pull" orientation of the preferred embodiment that has the one spindle swing arm in a leading position and one spindle swing arm in a trailing position before returning to a detailed discussion of the components of the preferred embodiment.

Figure 3:
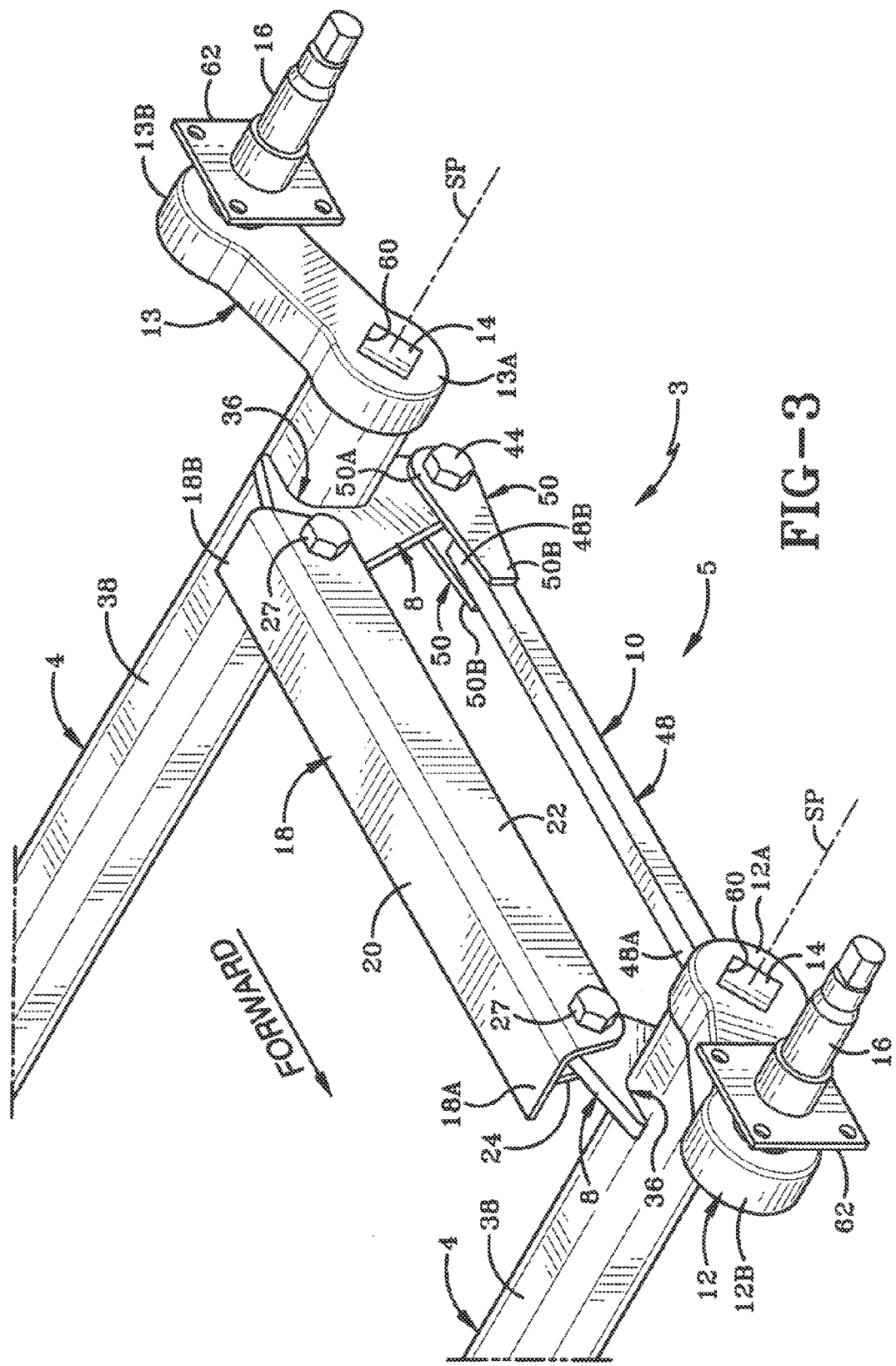
FIG. 3 is an example perspective view of the improved vehicle suspension assembly of the present invention.

As previously mentioned, the preferred embodiment includes a suspension assembly 5 that includes two torsion axle assemblies 4, two levers 8 and a control arm 10 (FIG. 3). A stationary frame mounting bracket 18 is used to mount the suspension assembly 5 to the frame rail 6 of a trailer 2 or another vehicle. Each torsion axle assembly 4 is attached to a generally central portion of a respective lever 8. Each lever 8 has one of its ends connected to an end of the frame mounting bracket 18 and another end connected to an end of the control arm 10. Spindle swing arms 12, 13 are connected to central torsion axle shafts 14 so that one spindle swing arm 12 is pointed and being pushed forward with respect to a motion of travel of the trailer 2 and the other swing arm 13 is pointed rearward with respect to the motion of travel of the trailer. This is known as the "push-pull" configuration. As in all configurations, when one spindle swing arm elevates (or is forced upward) when encountering a bump, it rotates one way (the spindle moves upward) to raise one end of its spindle swing arm 12 while this in turn causes (through the levers 8 and control arm 10) the other spindle to rotate in the opposite direction so that its far end is forced downward. In general, this configuration of suspension assembly components provides for a suspension assembly 5 that provides essentially equal loads on both torsion axles 4. The load applied to one swing arm is reacted and both rubber torsion axle springs are deflected. This response to a dynamic load means that the spring rate is reduced to approximately one half the value of one torsion axle responding to the force. This significantly improves the ride.

The suspension system 3 does not use an air spring and still provides many advantages over prior suspension systems. For example, the kinematics of the preferred embodiment of the suspension system 3 keeps the force on each tire 7 and torsion axle assembly end nearly identical to the load on the other torsion axle assembly mating end on a given side of the trailer even when traveling over obstructions up to five inches. The loads are also equalized when the trailer towing heights, hitch heights and/or ramp angles are encountered that would ordinarily cause one axle to carry the load from both axles. The suspension system 3 protects the rubber torsion axle assemblies 4 from being overloaded in tandem and tri-axle applications. The improved spring rate mentioned above increases the available deflection of the swing arms 12, 13 because when one torsion axle shaft 14 is loaded, it transmits the load through the levers 8 and control arm 10 to the other torsion axle shaft 14 and both rubber torsion axle springs are deflected to share the load. This doubles the available deflection and allows the suspension system 3 to absorb larger bumps and be softer over any given bump. The arrangement of this system 3 can reduce the load imposed on the vehicle chassis to one half the magnitude it would have been if it were only absorbed by one rubber torsion axle assembly 4. The fact that the axle-to-axle loads are equalized before being tasked with absorbing bumps further reduces loads imposed on the chassis because each of the equalized axles is at the lowest spring rate part of its performance curve and not at a more highly loaded spring rate part of its capability.

In the FIGS. 1-15, the preferred embodiment is illustrated in the "push-pull" example configuration. However, in other configurations (FIGS. 17-30) the preferred embodiment can be implemented in a "pull-pull" configuration. In the "pull-pull" configuration, the spindle swing arms 12, 13 are mounted to the torsion axle assemblies 4 so that they are generally pointing in a similar direction so that if one spindle encounters a bump it is pushed upward and this in turn causes (through the levers 8 and control arm 10 and some other type of motion reversing mechanism) the other spindle swing arm to rotate in the opposite direction so that its far end is forced downward. The "pull-pull" configuration of the preferred embodiment can be implemented with gears as shown in FIGS. 17-24, levers as shown in FIGS. 25-30, bell-cranks, a cable and drum combination, and other ways and methods can be used to ensure that spindle swing arms 12, 13 rotate in opposite directions while connected together with their respective suspension assemblies 4. Both the "push-pull" and the "pull-pull" configurations equalize forces on the rubber torsion axles and are softer riding with a reduced spring rate without using an expensive air spring and air supply system. However, the "push-pull" configuration may have a tendency to "brake hop" in some applications. The "pull-pull" configuration may have more components but is not an oscillating system and will not brake hop.

Returning to a detailed description of the components of the preferred embodiment of the suspension assembly 5, it can be best seen in FIGS. 3-5 and 7 that the frame mounting bracket 18 is elongated with a first end 18A and a second end 18B. The mount 18 includes a top wall 20, an outer side wall 22 and an inner side wall 24. In the preferred embodiment, the top wall 20 and outer side wall 22 can be formed out of a bar of steel angle and the inner side wall 24 can be a piece of flat steel that is welded under the top wall 20 to form an inner side wall 24 that extends parallel to the outer side wall 22. Of course, other metals or other rigid materials can be used and the inner side wall 24 can be attached to the upper side wall 20 in any appropriate way as understood by those with ordinary skill in the art. Holes 26 are formed in the outer side wall 22 and the inner side wall 24. Fastening devices 27 (such as bolts) pass through the holes 26 on the frame mounting bracket 18 and complementary holes on the levers 8 to pivotally attach the levers 8 to the bracket 18 so that they pivot about frame mount pivot points FP. For purposes of this Specification, a fastening device can be any device to attach one object to another and can include, for example, bolts, nuts or another device, and if no movement is desired, can include welds, glue or another attachment device or material. Ball bearings 28, bushings and/or other devices can be used in or around the fastening devices 27 to provide for ease of rotation between the levers 8 and the frame mounting bracket 18.

Figure 8:
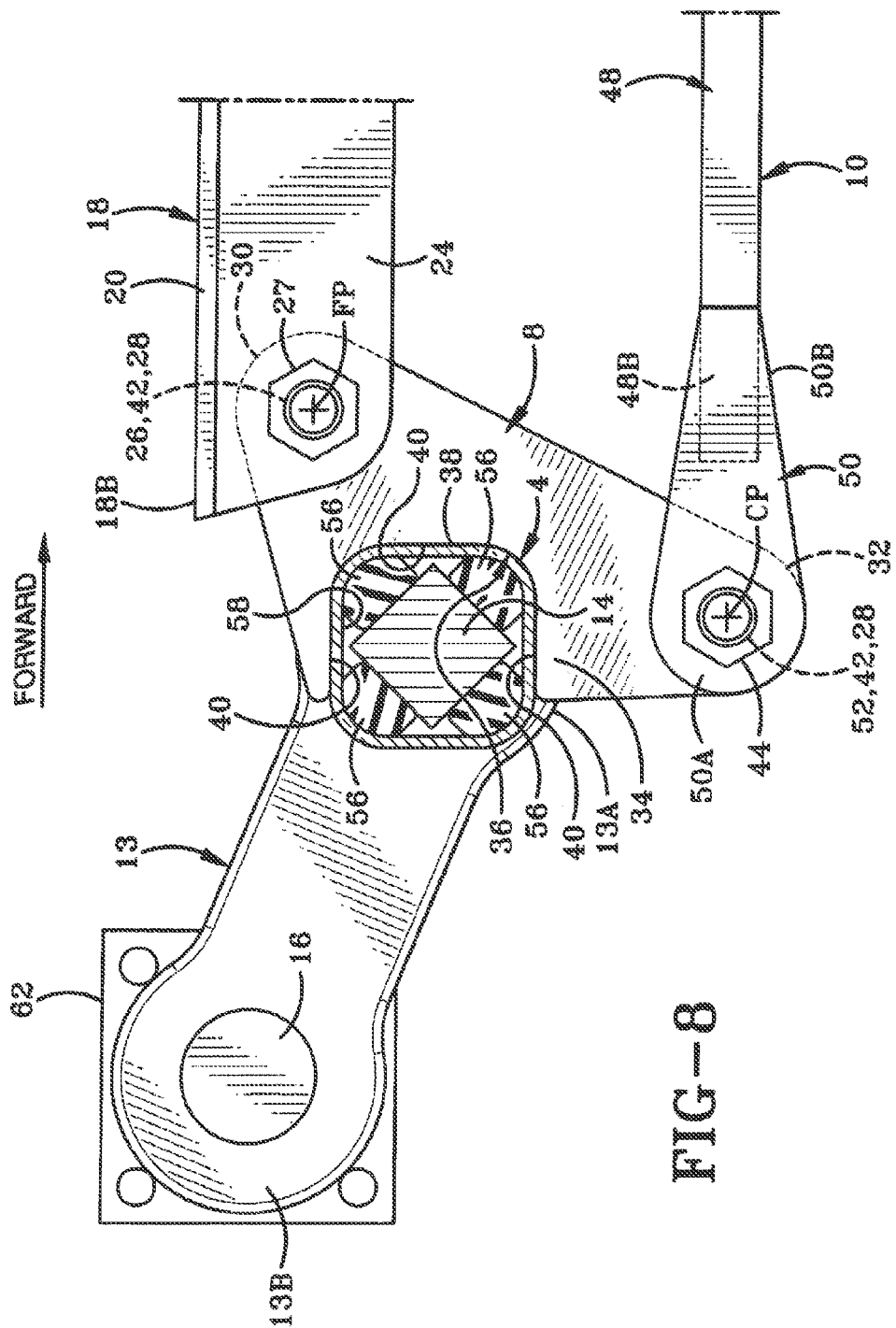
FIG. 8 is an example cross-sectional view one end of a torsion axle equalizing system of the improved suspension assembly with two levers and a control arm.

The levers 8 can be formed out of metal or another material. The levers 8 of the preferred embodiment are formed out of flat pieces of metal having upper ends 30 and lower ends 32 as well as a central protruding area 34 (FIG. 8). A cutout 36 (best seen in FIG. 8) is formed in the central protruding area 34 that is formed so that it is complementary to the outer housing 38 of the torsion axle assembly 4. In the preferred embodiment, this cutout 36 is formed so that three sides 40 of the cutout wrap around the outer housing 38 of the torsion axle assembly 4 when the outer housing 38 is mounted to lever 8. A cutout 36 formed in the levers 8 helps to assure that the outer housing 38 of the torsion axle is securely attached to and moves with the lever 8 after it has been welded to or attached to the lever 8 in another suitable way. Holes 42 are formed in the upper ends 30 and lower ends 32 of the levers 8. Fastening devices 44 can be passed through the holes 42 in the lower ends 32 to pivotally attach the control arm 10 to the levers 8 so that it rotates about control arm pivot points CPs. As mentioned earlier, fastening devices 27 can be passed through the holes 42 in the upper ends 30 to pivotally attach the link 8 to the frame mounting bracket 18. Similar to the frame mounting bracket pivot point (FP), ball bearings 28, bushings and/or other devices can be placed around or near the fastening devices 44 to provide for ease of rotation between the levers 8 and the control arm 10.

Figure 4:
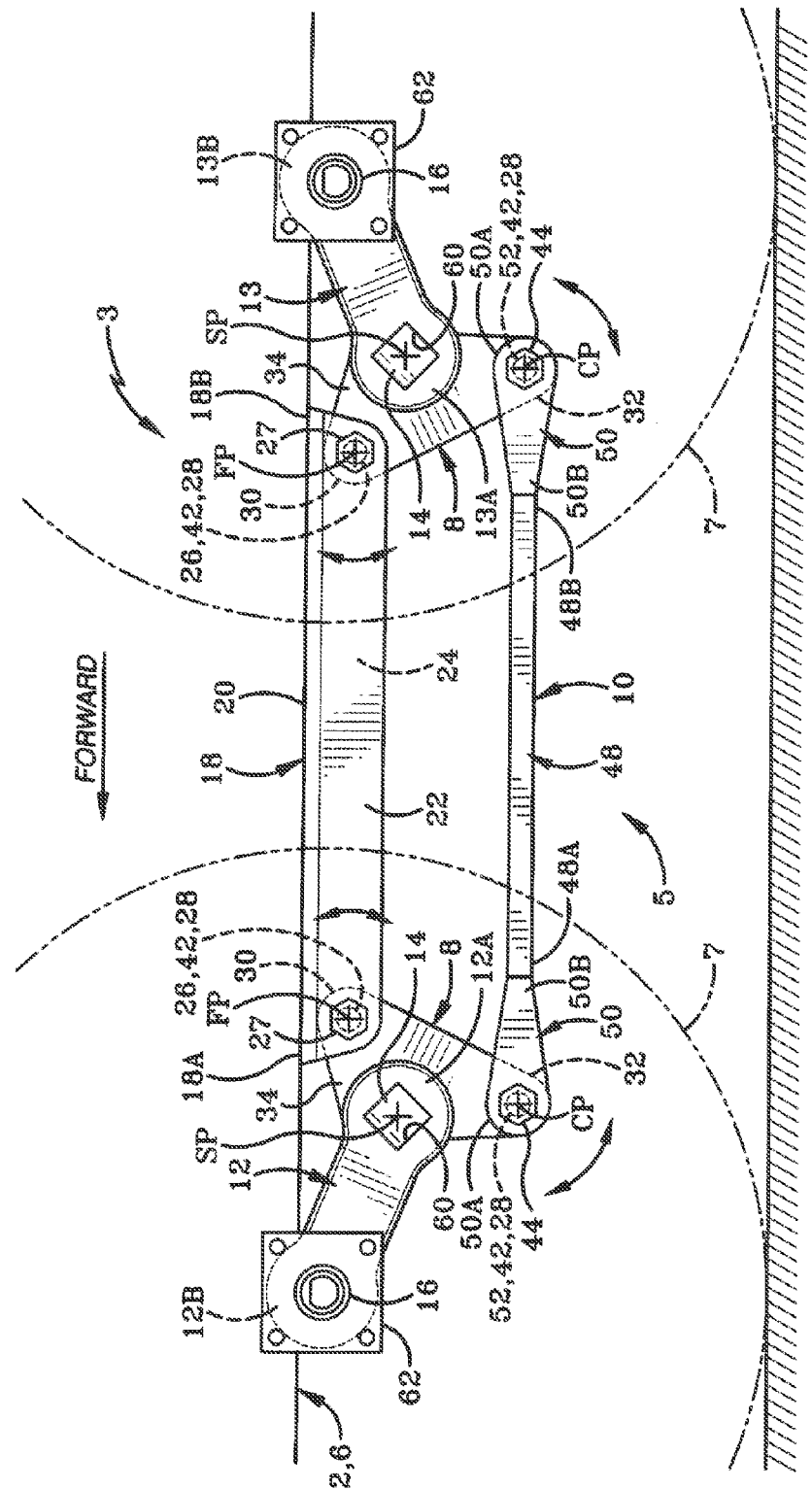
FIG. 4 is an example view of the improved vehicle suspension assembly in the design position with the trailer frame level with the ground.
Figure 5:
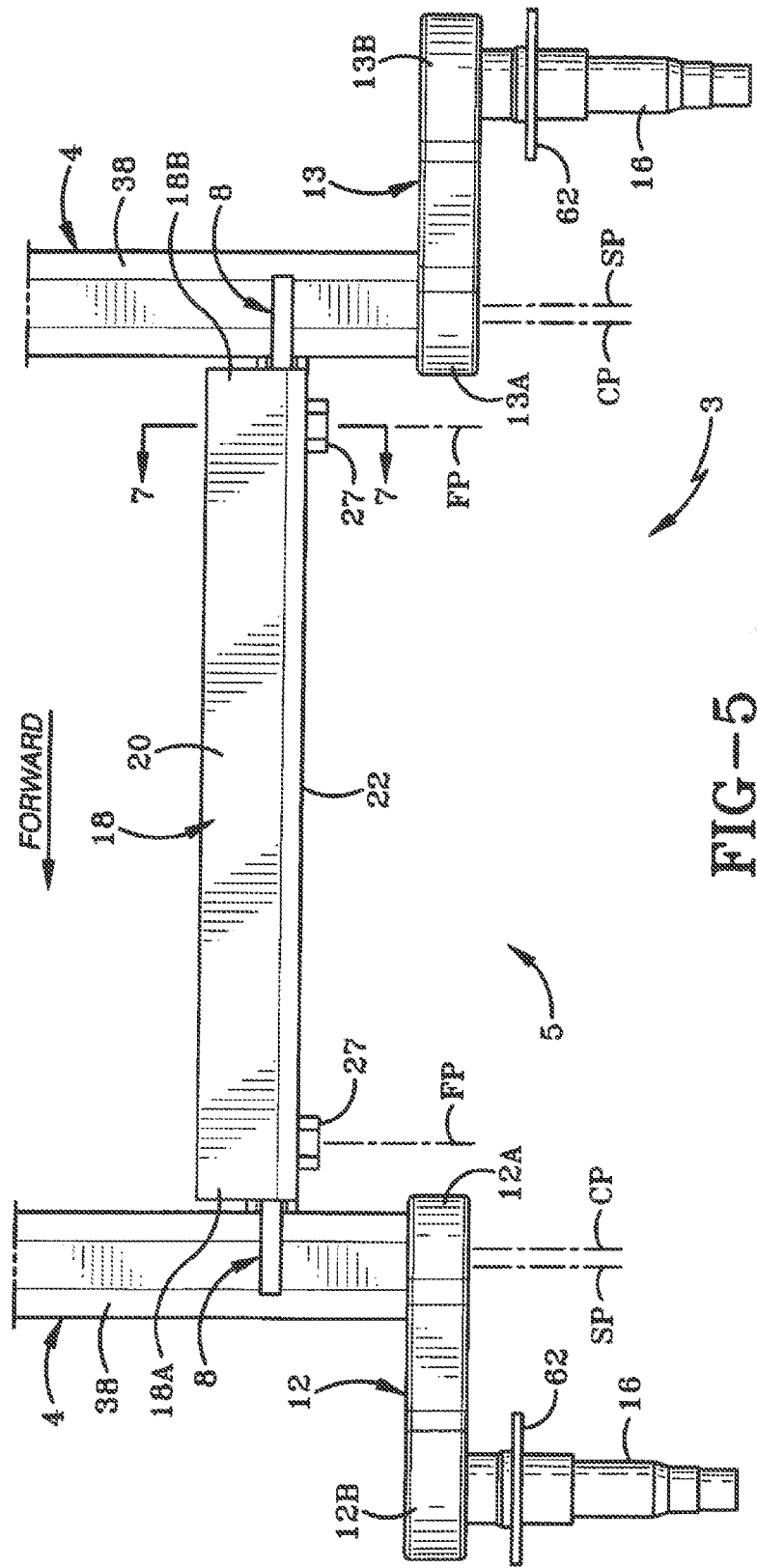
FIG. 5 is an example top view of the improved vehicle suspension assembly with two levers and a control arm.
Figure 6:
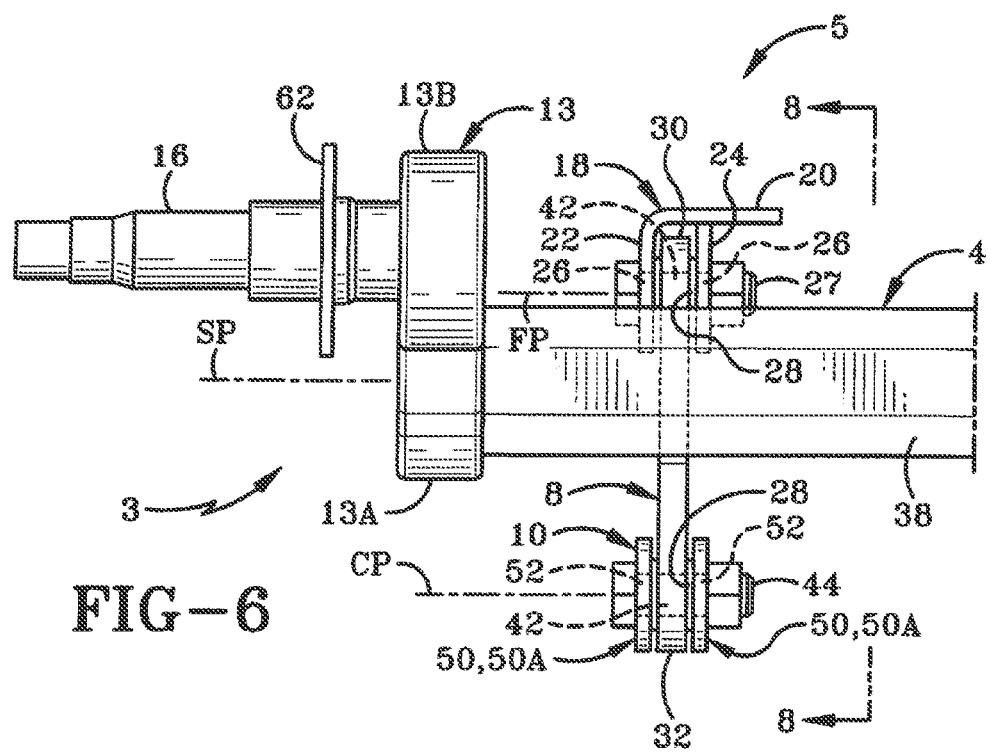
FIG. 6 is an example rear view of the improved vehicle suspension assembly with two levers and a control arm.
Figure 7:
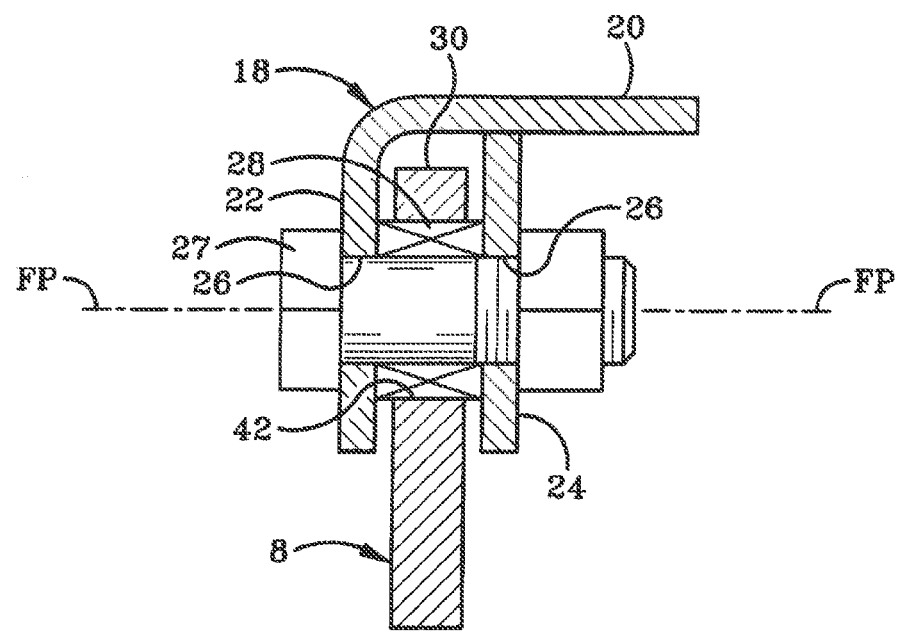
FIG. 7 is an example cross-sectional view of the frame mount pivot point.

In the preferred embodiment, the control arm 10 is formed with a control rod 48 and four end plates 50 (FIG. 4). In other configurations, the control arm 10 can be a solid piece of material or other combinations of components. The control rod 48 is elongated with a first end and a second end and the end plates 50 are also elongated with first ends 50A and second ends 50B. The control rod 48 can be a square piece of solid metal such as steel or the like and the end plates 50 can be cut or formed out of a flat sheet of steel or the like. The second ends 50B of the end plates 50 can be attached to the control rod 48 by welding, bolting or in another suitable manner to withstand the forces created by the lever 8 and torsion axle assemblies 4 during operation of the suspension system 3. Holes 52 are formed in the first ends 50A of the end plates 50 so that, as mentioned above, a fastening devices 44 can be used to pivotally attach the control arm 10 to the lower ends 32 of the levers 8.

The rubber torsion axle assembly 4 includes the generally square-shaped outer housing 38 and a central torsion axle shaft 14 at each end thereof (FIG. 8). Each central torsion axle shaft 14 is movably rotatably mounted about a spindle swing arm pivot axis SP (FIGS. 3-5) within outer tube 38. The torsion axle assembly 4 includes four torsion axle rubber springs 56 (FIG. 8) which are press-fitted within the hollow interior 58 of outer tube 38 and resiliently support the central torsion axle shaft 14 therein. The torsion axle assembly 4 can be similar to a well-known torsion axle, one type being sold under the trademark TOR FLEX from Dexter Axle.

Each spindle swing arm 12, 13 is similar to each other (FIG. 3) and are an elongated shape with first ends 12A, 13A and second ends 12B, 13B. They each contain a cutout 60 in their first ends 12A, 13A through which the central torsion axle shafts 14 are rigidly attached by welding or attached in another suitable way. Spindles 16 are attached to the second ends 12B, 13B of the spindle swing arms 12, 13. Brake assemblies can be attached to the brake assembly mounts 62 attached to the spindles 16 and wheel mount assemblies can be attached to the spindles 16.

Having described the various components of the preferred embodiment of the suspension system 3, its operation and use will now be described. The primary uniqueness of the suspension system 3 is that it causes (through the levers 8 and control rod 10) the central torsion axle shafts 14 can be pivoted ahead (or behind) the outer housing 38 of the torsion axle assembly 4. By pivoting the outer housing 38 normally connected to the frame rail 6 mounted on the trailer 2, the linkage system (the levers 8 and control rod 10) could be used to equalize loads on both torsion axles.

Figure 9:
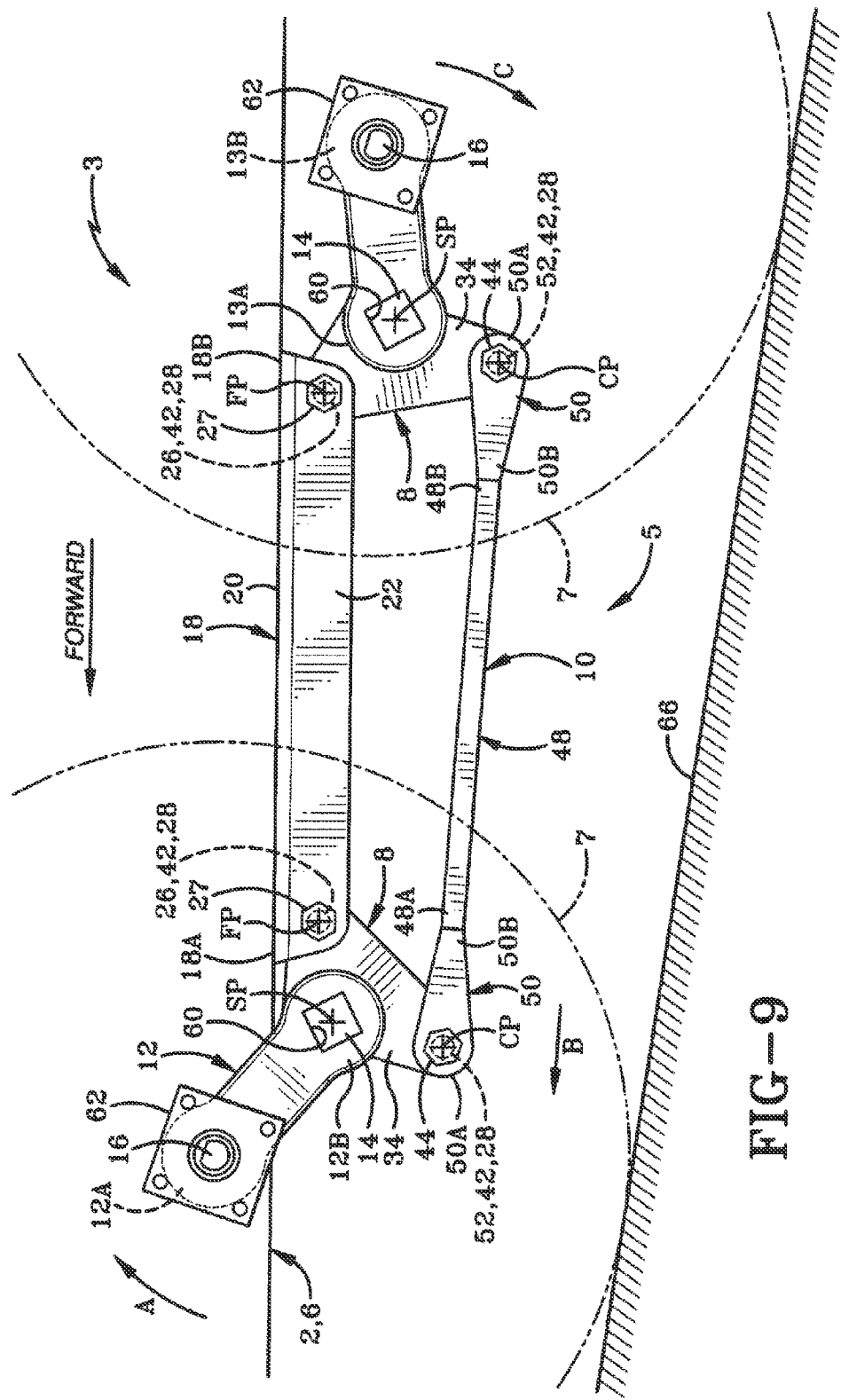
FIG. 9 is an example view of the improved suspension assembly with the trailer frame and ground not parallel. This illustrates a condition where the trailer hitch is too low or the trailer is going up a slope.

FIG. 9 illustrates an example view of when the truck 1 has already passed over a summit of a hill and the trailer 2 is approaching the summit after traveling up a long incline or the situation when the forward wheel encounters a bump. The following explanation is generally the same for when a wheel 7 attached to the leading spindle swing arm 12 encounters or rolls over a bump in a surface 66. If this suspension system 3 was designed similar to some prior art suspension systems, it is likely that as the trailer 2 starts to reach the summit of a hill (or roll over a bump), the leading spindle swing arm 12 and its torsion axle assembly 4 would carry the brunt of the forces associated with reaching that summit (or hitting that bump) while the trailing spindle swing arm 13 and it's torsion axle assembly 4 would carry much less of those forces if any. However, as illustrated in FIG. 9, the levers 8 and control arm 10 cause the torsion axle assemblies 4 to both react to force encountered together to reduce the spring rate to each one of them. This ensures that the torsion axle assemblies 4 operate for greatly improved swing arm deflection. This also reduces the replacement cost of the torsion axle assembly rubber springs 56 because they are rarely overloaded because in this configuration they operate at about half the spring rate as other typical dual-axle suspensions.

When the front wheel 7 attached to the leading spindle swing arm 12 begins to reach the summit, the weight of the trailer 2 causes the spindle swing arm 12 to rotate in the direction of arrow A. This causes two primary events. First, rotating the spindle 12 in the direction of arrow A causes it to pivot the outer housing 38 of the torsion axle assembly 4 which causes its central torsion axle shaft 14 to similarly pivot and to begin absorbing some of the forces of the suspension system 3. Second, this rotational movement also causes, through the lever 8 attached to spindle swing arm 12, to move control arm 10 in the direction of arrow B. This movement of the control arm 10 in turn causes the lever 8 attached to spindle swing arm 13 to rotate in the direction of arrow C along with its rubber torsion axle assembly 4 to force its wheel downward toward the road surface 66. The rotation of spindle swing arm 13 and its rubber torsion axle assembly 4 causes this rubber torsion axle assembly 4 to begin to respond to forces experienced at the leading torsion axle assembly 4 connected to leading spindle swing arm 12 so that both torsion axle assemblies respond to the forces in tandem.

Figure 10:
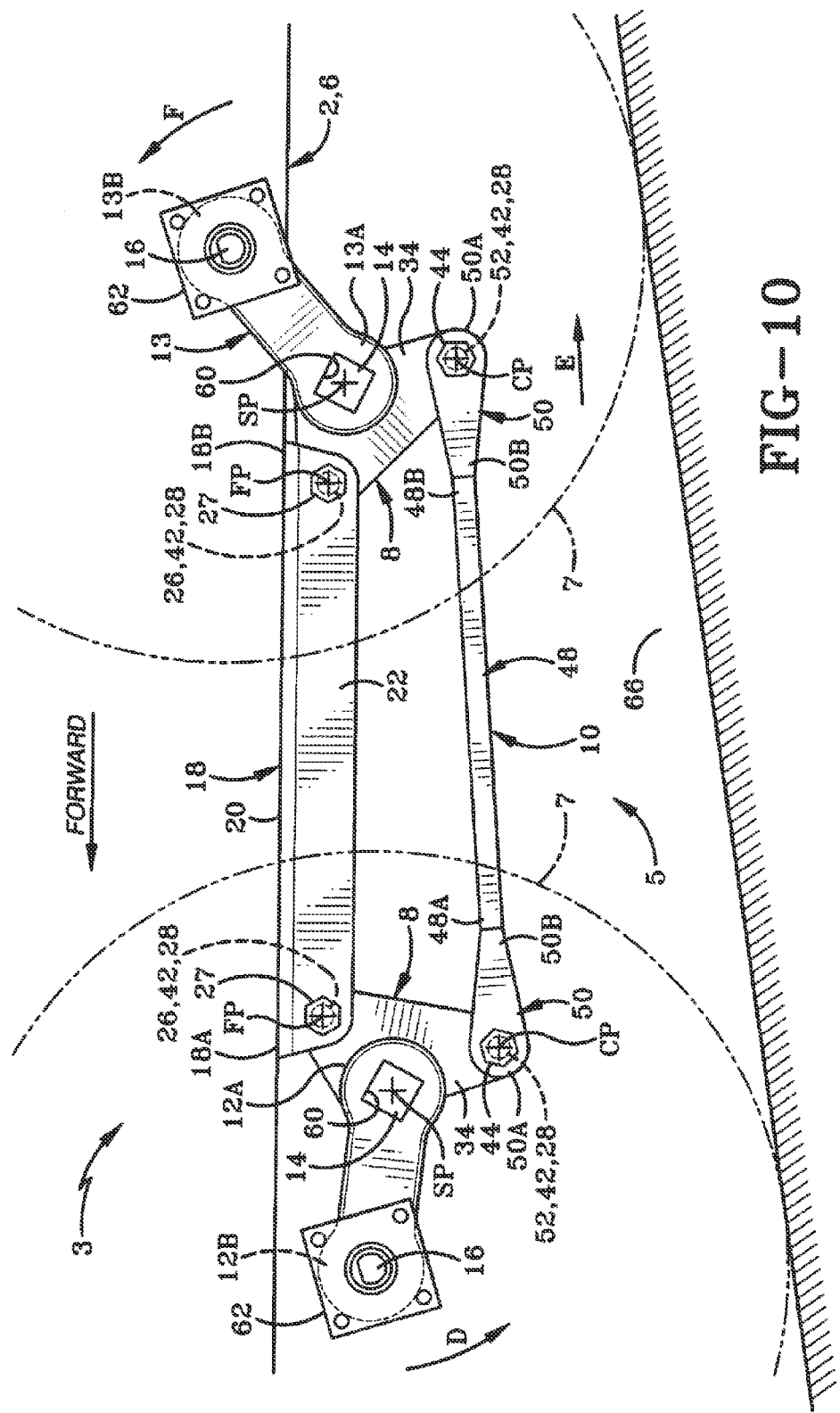
FIG. 10 is an example view of the improved vehicle suspension assembly descending a hill or with a trailer hitch mounted too high.
Figure 11:
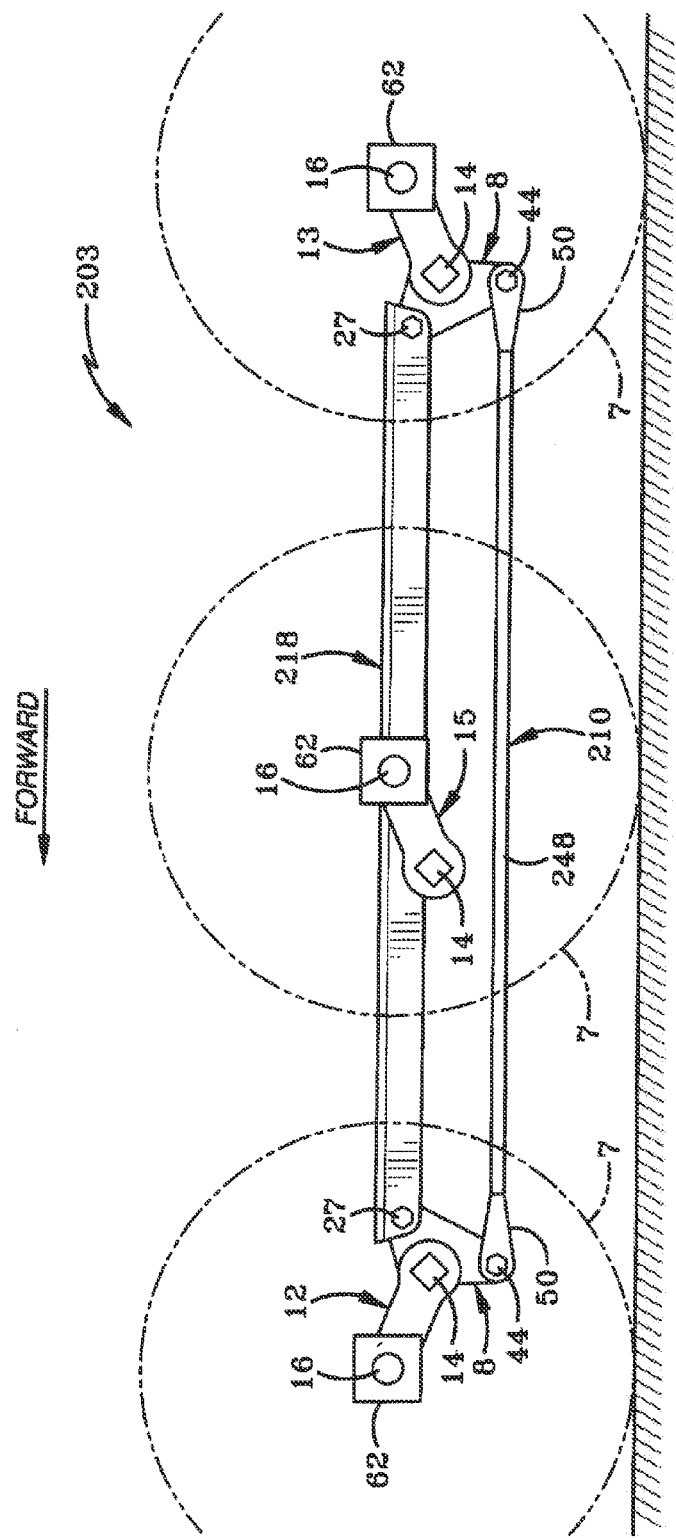
FIG. 11 is an example view of the improved vehicle suspension assembly with three axles, two levers and a control arm.
Figure 12:
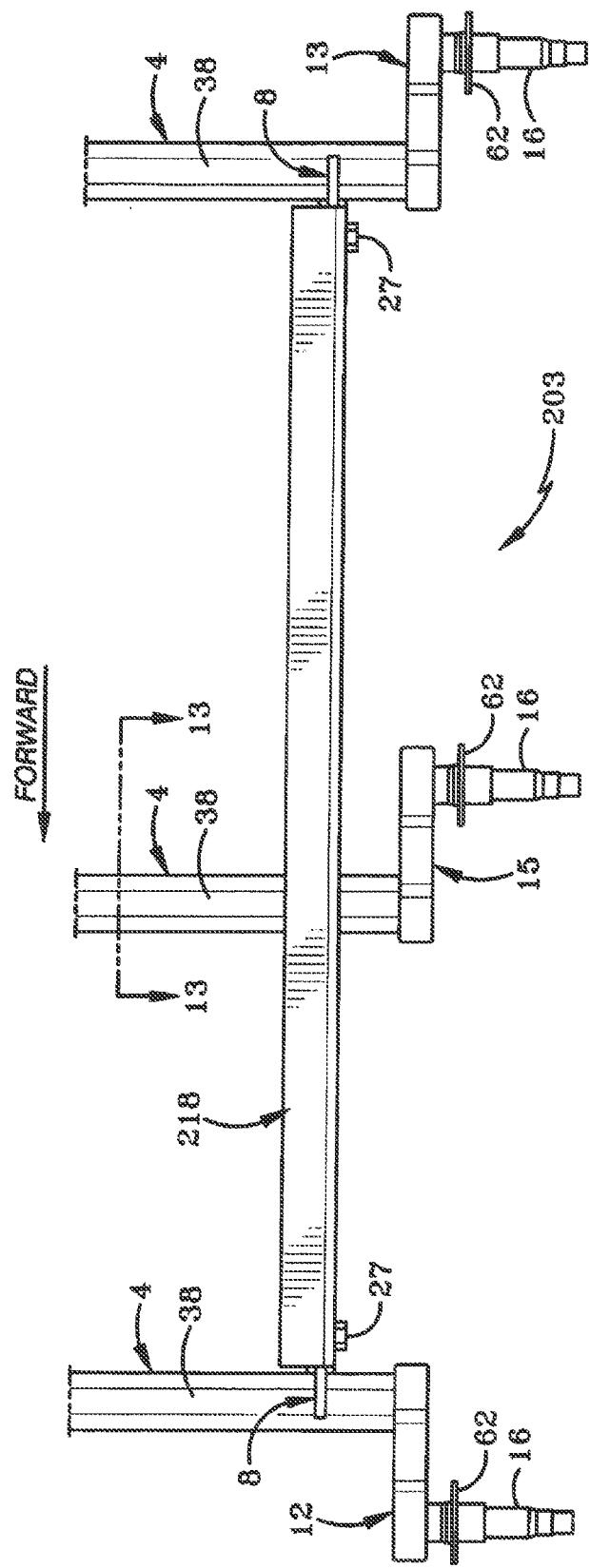
FIG. 12 is an example top view of the improved vehicle suspension assembly with three axles, two levers and a control arm shown at design height with the trailer frame parallel to the ground.
Figure 13:
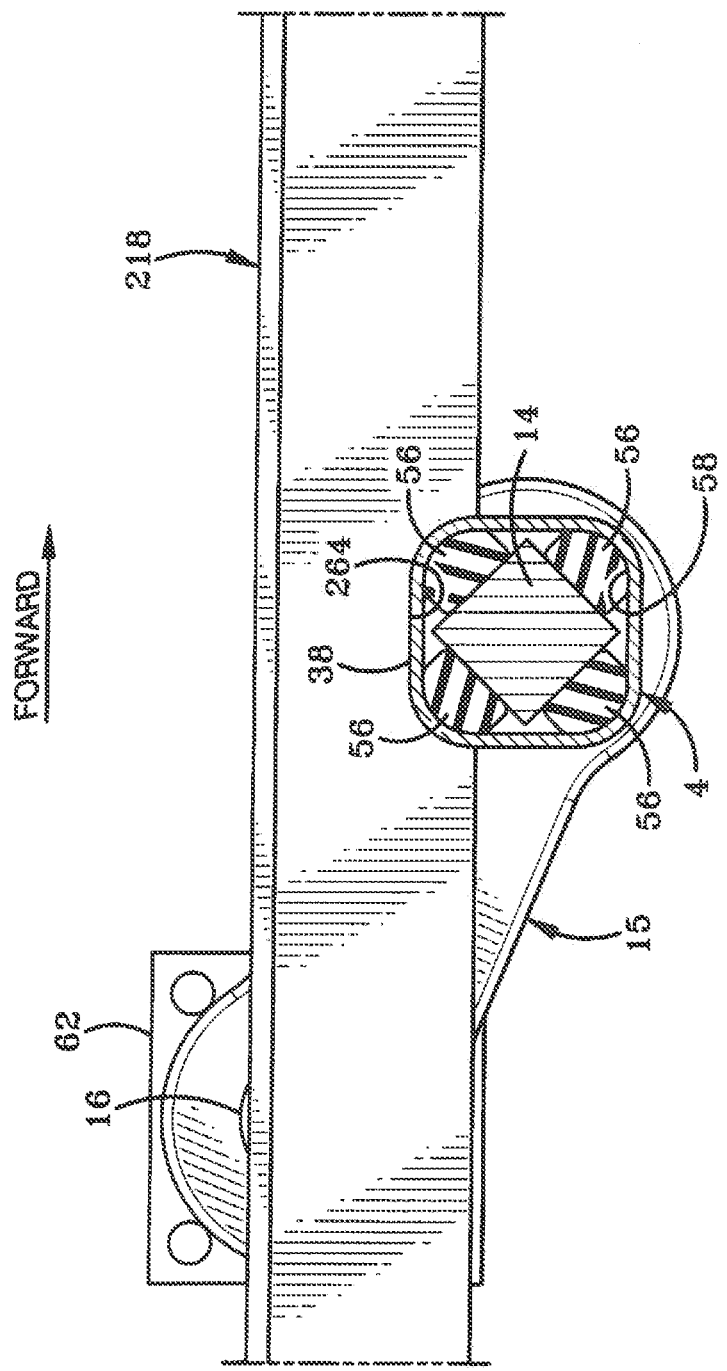
FIG. 13 is a cross-sectional view of the center axle of the improved vehicle suspension assembly with three axles, two levers and a control arm.

FIG. 10 illustrates events that occur when the truck 1 has already descended a hill and the trailer 2 has almost completed its decent down an incline or the trailer hitch is too high. In general, a similar sequence of events happens except in reverse to those explained above with reference to FIG. 9, Returning to FIG. 10, as the suspension assembly begins rolling down the incline, trailing spindle swing arm 13 rotates in the direction of arrow F which causes the lever 8 to pull the control arm 10 in the direction of arrow E. This in turn causes the lever 8 connected to leading swing arm 12 to move in the direction of arrow D. The linkage of the two levers 8 through the control arm 10 and the resulting movement of suspension assembly components provides equalization of the loads imposed on the springs 56 in both rubber torsion axle assemblies 4 and theoretically allows for twice the deflection for a given input load for each spindle swing arm 12, 13.

A tri-axle configuration of the preferred embodiment is illustrated in FIGS. 11-15. In general, the components illustrated in this tri-axle suspension system 203 are similar to the components described above; however, they may be sized larger or further reinforced to handle larger loads in a larger tri-axle trailer. Even though some components may be sized larger and/or reinforced, many of the components in this example illustration are labeled with the same reference numbers and drawn similarly to earlier Figures discussed above for ease of explanation and understanding.

Because the tri-axle configuration needs to make room for a third wheel, two components (the frame mounting bracket 18 and the control rod 48) have been elongated in this configuration. The elongated control arm 210 and its control rod 248 (FIG. 11) are the same as the control arm 10 and control rod 48 described earlier except that they are further elongated. The elongated frame mounting bracket 218 is the same as the mounting bracket 18 described earlier except that it is longer and has a cutout 264 (FIG. 13) that is shaped to the outside housing 38 of the rubber torsion axle assembly 4 allowing the outside housing 38 to be rigidly attached to the underside of the elongated frame mounting bracket 218. The levers 8 are attached at the ends of the elongated frame mounting bracket 218 as discussed above and other components of this configuration are attached together as discussed above.

Figure 14:
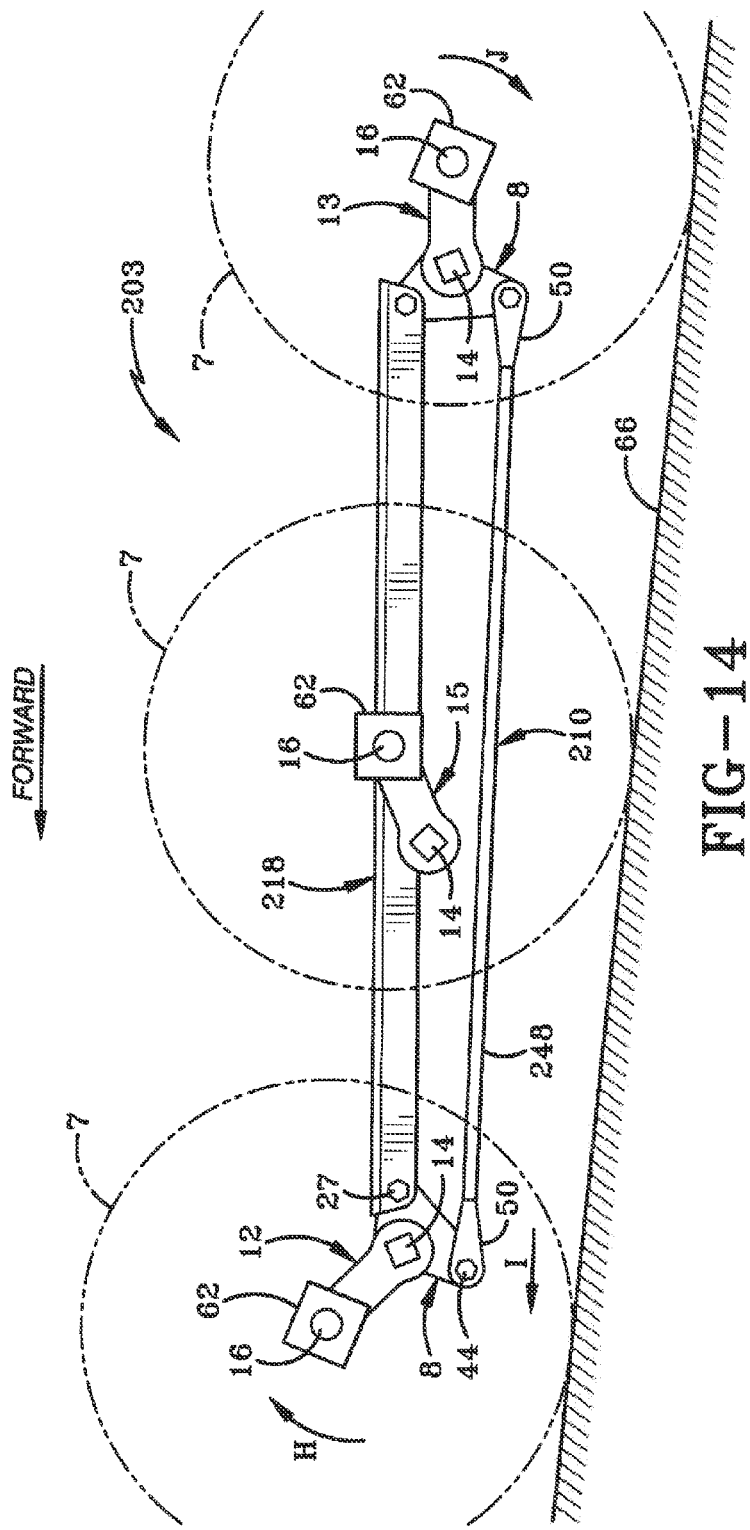
FIG. 14 is a view of the improved vehicle suspension assembly with three axles, two levers and a control arm going up a slope or with a low hitch height. Note that the trailer frame is not parallel to the ground.

The tri-axle suspension system 203 of FIGS. 11-15 operates somewhat similarly to the tandem-axle suspension system of FIGS. 1-10. FIG. 14 illustrates an example Figure of the suspension system 203 reaching the peak of an elevation after having driven up a long straight incline. As the towing vehicle/truck 1 crests the summit, the weight of the trailer 2 forces the leading spindle arm 12 to rotate clockwise in the direction of arrow H in order to avoid overloading wheel 7. The leading spindle arm 12 rotates clockwise along with its rubber torsion axle assembly 4. This causes two primary events. First, rotating the spindle 12 in the direction of arrow H causes it to pivot the outer housing 38 of its torsion axle assembly 4 which in turn causes its central torsion axle shaft 14 to similarly pivot and to begin absorbing some of the forces on the suspension system 3. Second, this rotation also causes, through the lever 8 attached to the outer housing 38 of spindle swing arm 12, to pull control arm 210 in the direction of arrow I. The movement of the control arm 210 in turn causes the lever 8 attached to the outer housing 38 of the trailing spindle swing arm 13 to rotate in the direction of arrow J along with its rubber torsion axle assembly 4 to cause this rubber torsion axle assembly 4 at spindle swing arm 13 to begin to respond to forces experienced at the leading torsion axle assembly 4 connected to leading spindle swing arm 12 so that both rubber torsion axle assemblies 4 at each end of the suspension system 203 respond to the forces in tandem. While the rubber torsion axle assemblies 4 at both ends of the suspension system 203 are responding to forces of reaching the summit (or the hitch height of the trailer is too low), the central wheel and its spindle swing arm 15 remains deflected to its loaded position so that the central torsion axle assembly also responds to absorb some of the force being experienced by the suspension system 203 to further ensure equalized axle loading and improve ride.

Figure 15:
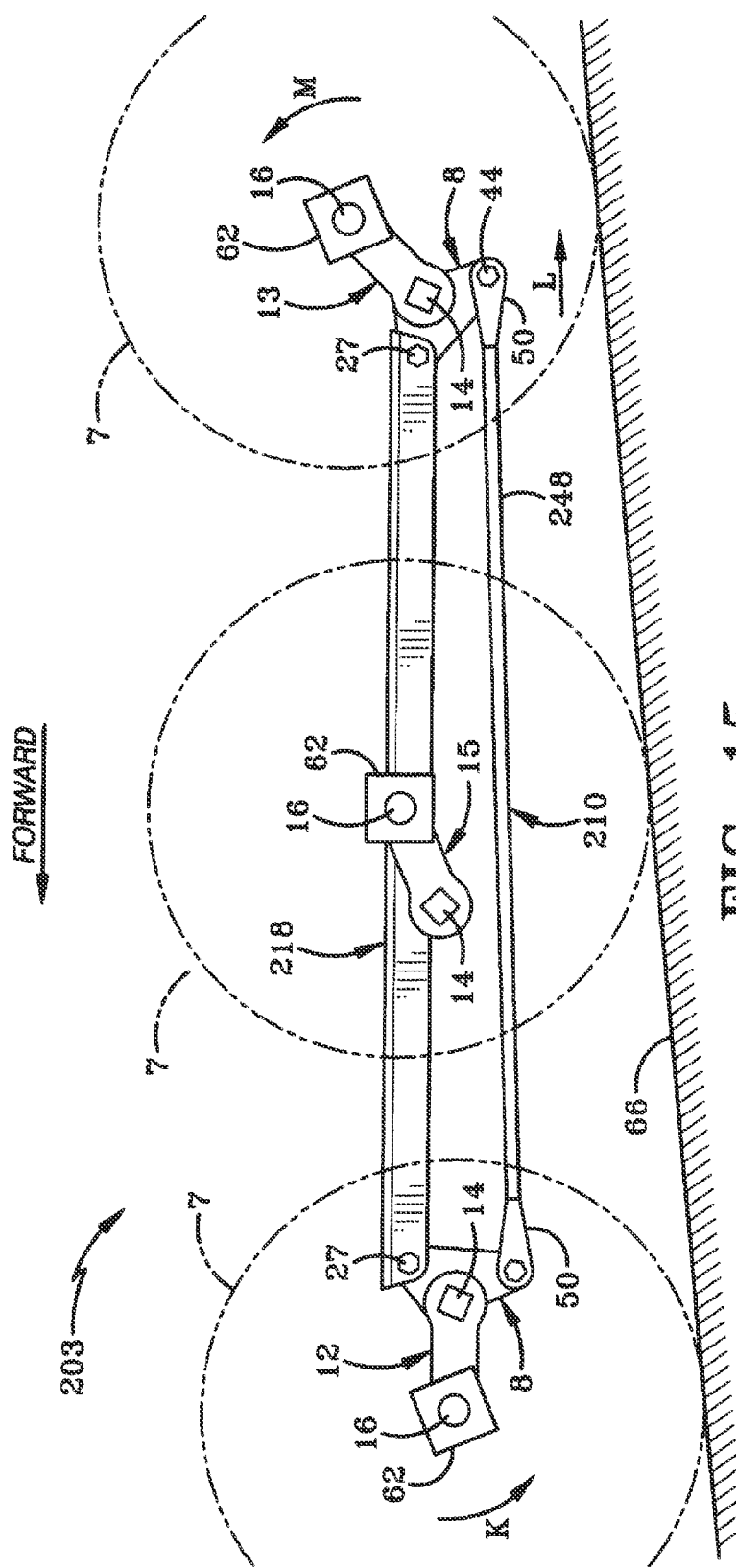
FIG. 15 is a view of the improved vehicle suspension assembly with three axles, two levers and a control arm going down a hill or with a high hitch height. Note that the trailer frame is not parallel to the ground.
Figure 16:
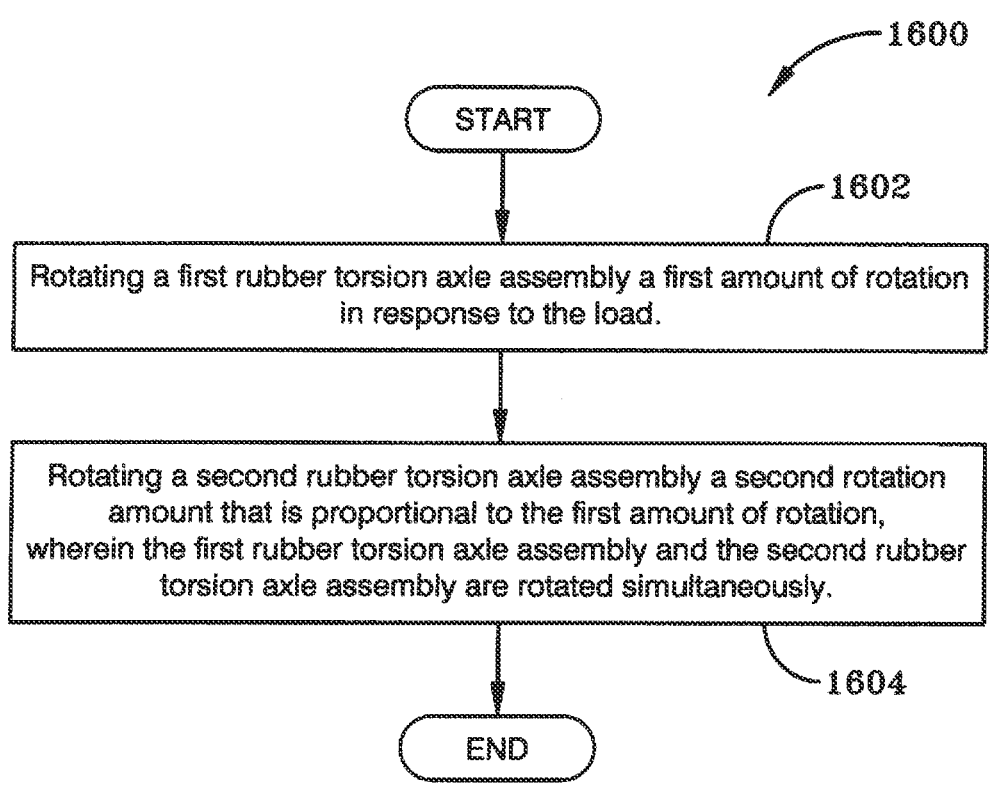
FIG. 16 is an example configuration of the preferred embodiment configured as a method.
Figure 17:
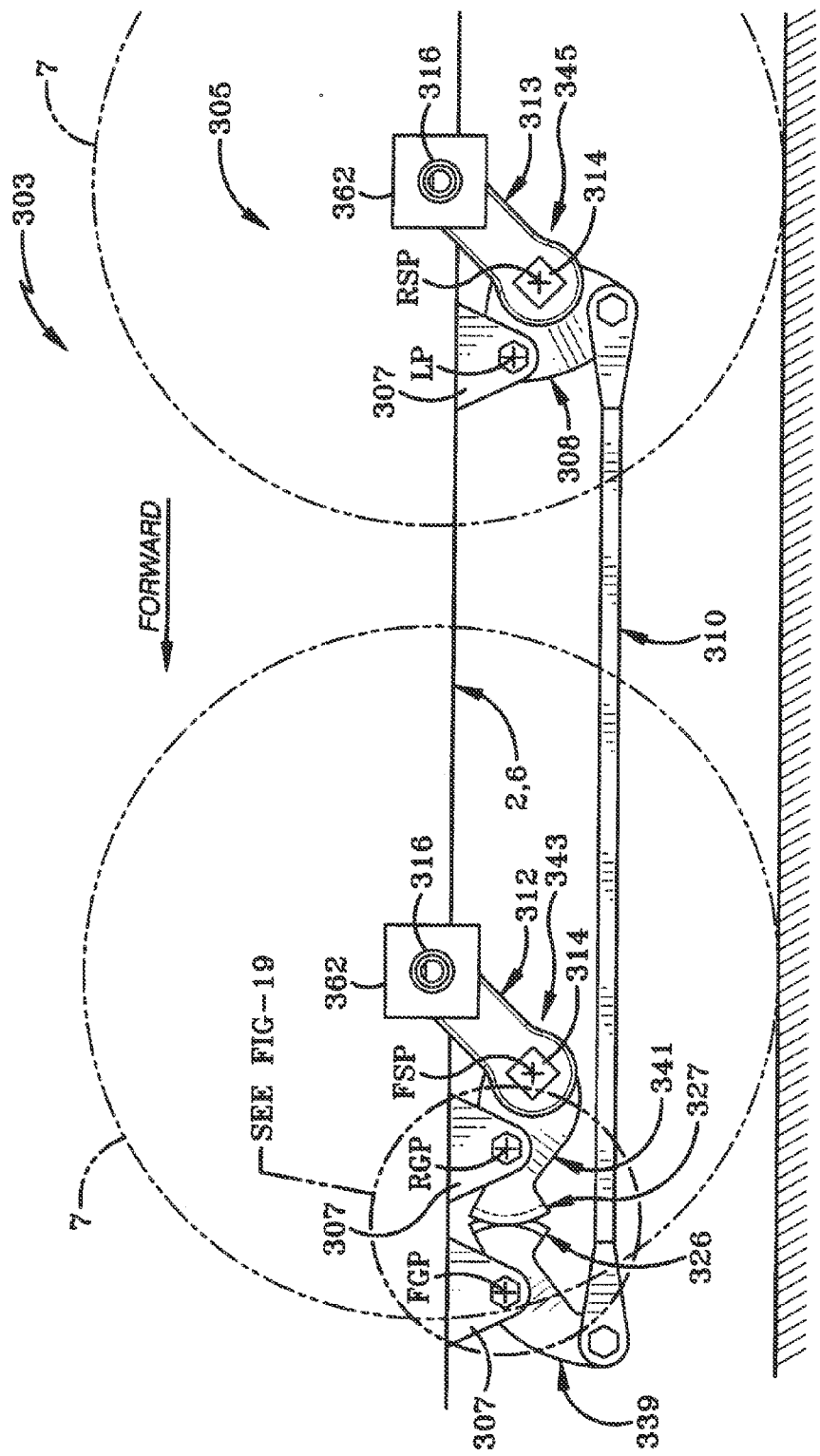
FIG. 17 illustrates an example "pull-pull" suspension implemented using partial gears.

FIG. 15 illustrates events that occur when the towing truck 1 has already finished a decent down an incline and the trailer 2 has not yet finished its decent down an incline or the hitch eight is too high. In general, a similar sequence of events happens except in reverse to those explained above with reference to FIG. 14. As the suspension assembly begins rolling down the incline (or the hitch height is too high), leading spindle swing arm 12 rotates in the direction of arrow K which causes its lever 8 to move the control arm 10 in the direction of arrow L. This in turn causes the lever 8 connected to trailing swing arm 13 to move counterclockwise in the direction of arrow M. The central wheel continues at the original loaded position, therefore the central rubber torsion axle assembly 4 continues to absorb its appropriate share of the force being experienced by the suspension system 203. The linkage of the two levers 8 through the control arm 10 and the resulting movement of suspension assembly components together with the reaction of the central torsion axle assembly provide substantially equal loads in all three rubber torsion axle assemblies 4.

FIGS. 17-21 illustrate an example first configuration of the preferred embodiment implemented in a "pull-pull" configuration using gears. In this configuration, pivot brackets 307 are mounted to the frame 6 of a trailer 2. However, the pivot brackets 307 could first be mounted to a frame mounting bracket similar to the frame mounting bracket 18 discussed above and then the frame mounting bracket is mounted to the trailer 2. A lever 308 similar to levers 8 discussed earlier is pivotally connected to the rear most pivot bracket 307 so that it pivots about a lever pivot point LP. Another end of the lever 308 is pivotally connected to a control arm 310. A rear rubber torsion axle assembly 345 similar to the torsion axle assemblies 4 discussed above is rigidly mounted in lever 308 and a rear spindle swing arm 313 is attached to the central torsion axle shaft 314 of that rear rubber torsion axle assembly 345.

A forward partial gear 339 is pivotally connected to the forward most pivot bracket 307 so that it can pivot about a forward gear pivot FGP and a rearward partial gear 341 is pivotally connected to the middle pivot bracket 307 so that it can pivot about a rear gear pivot RGP. A forward rubber torsion axle assembly 343 is rigidly attached to an end of the rearward partial gear 341 that is opposite the gear end of the rearward partial gear 341. A forward spindle swing arm 312 is attached to the central torsion axle shaft 314 of the forward rubber torsion axle assembly 343 and a brake mount 362 and a spindle 316 are mounted on the far end of the forward spindle swing arm 312.

Figure 18:
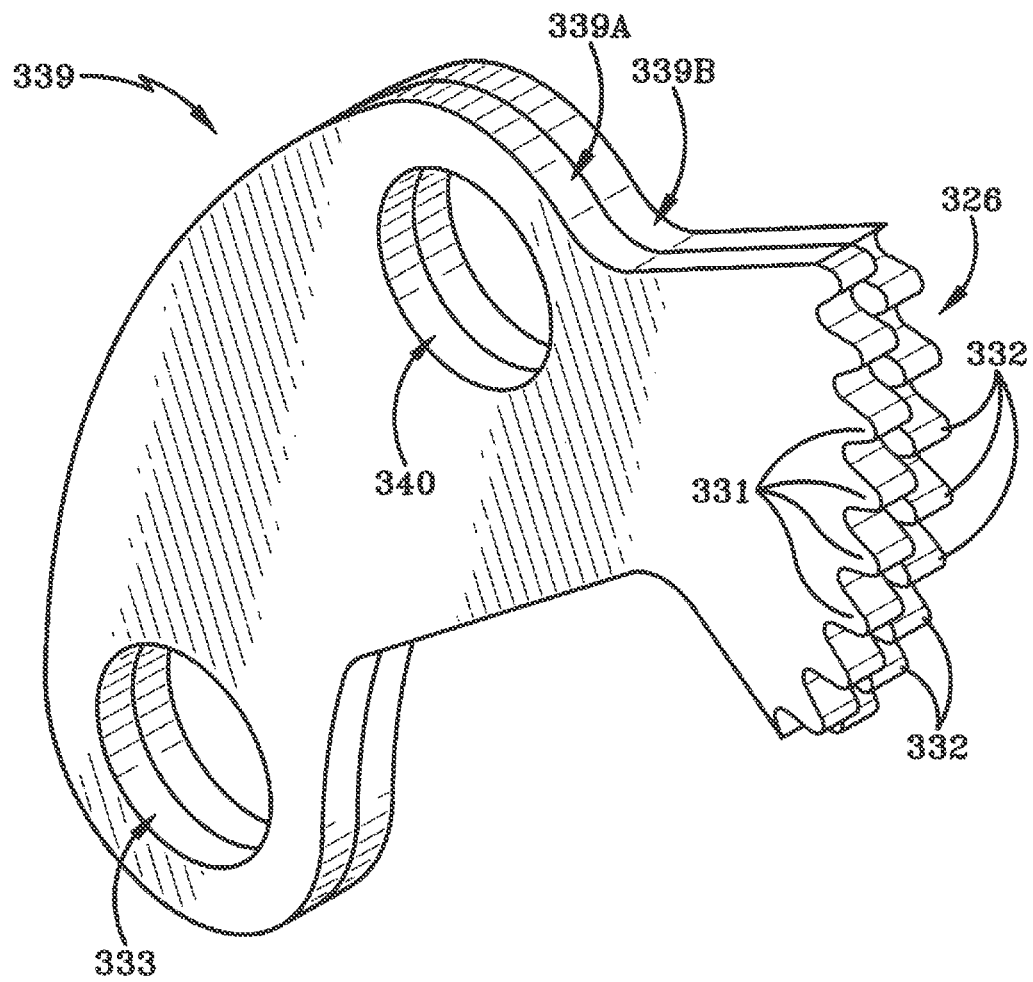
FIG. 18 illustrates a detailed view of one of the partial gears of FIG. 17.
Figure 19:
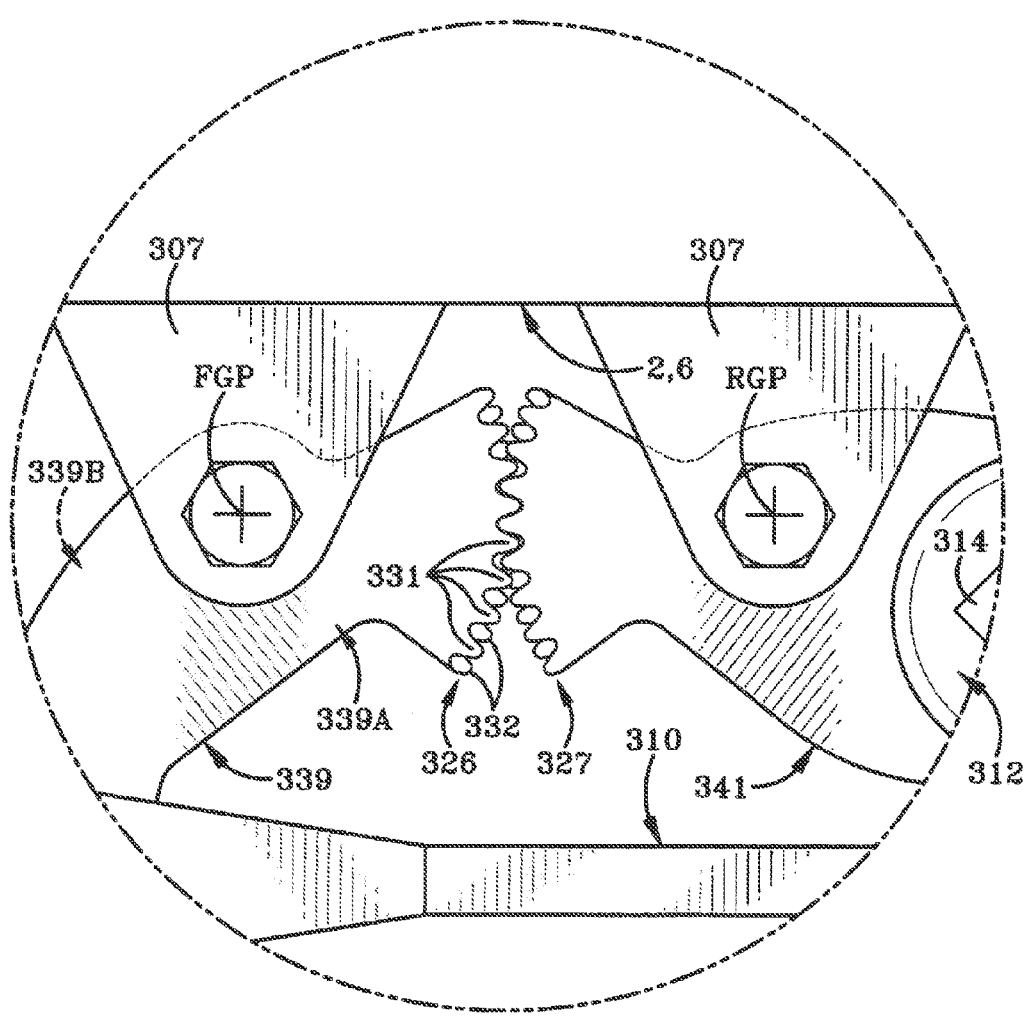
FIG. 19 illustrates a detailed view of the gears of FIG. 17.

One end of the forward partial gear 339 is pivotally connected to one end of the control arm 310. The other end of the forward partial gear 339 is formed with gear teeth 326. When the suspension assembly 305 is assembled, the gear teeth 326 of the forward partial gear 339 interlace with gear teeth 327 formed at one end of the rearward partial gear 341. As illustrated and best seen in FIG. 18, the forward partial gear 339 is formed with two separate plates 339A and 339B that are rigidly attached together. This allows for a first row of teeth 331 to be formed on one plate 339A and a second row of teeth 332 to be formed on the other plate 339B. These two rows of teeth 331, 332 are offset from each other as illustrated in FIG. 18. As shown in FIG. 19, this allows the teeth 326 of the forward partial gear 339 to be interlocked with the teeth 327 of the rearward partial gear 341. FIG. 18 also illustrates the forward partial gear 339 as an elongated shape with an opening 333 at the end where it is pivotally connected to one end of the control arm 310 and another opening 340 is located between opening 333 and the teeth 326 that is used to pivotally connected the forward partial gear 339 to the forward most pivot bracket 307.

Figure 20:
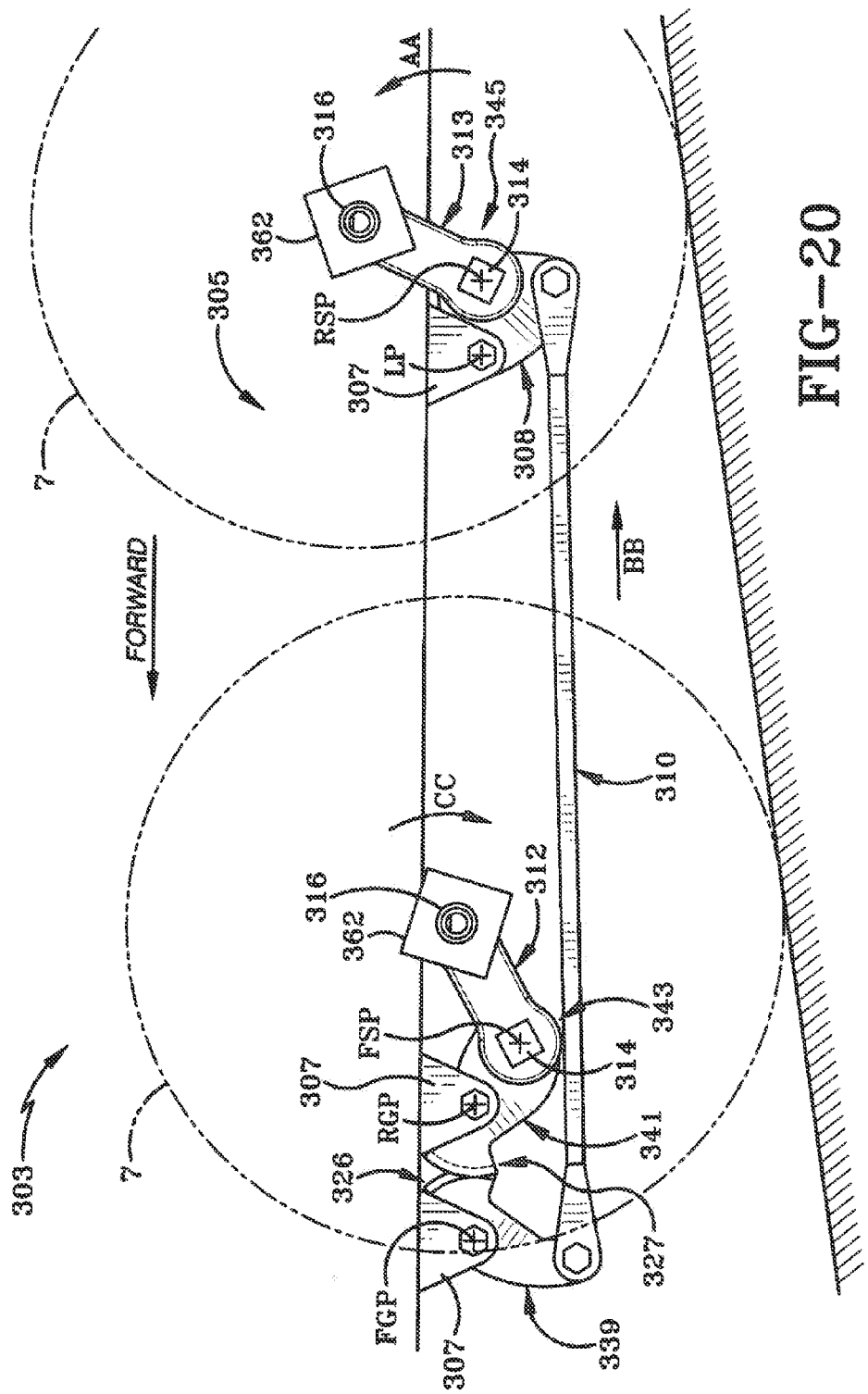
FIG. 20 illustrates the example "pull-pull" suspension of FIG. 17 descending a hill.

Having described the components of the example first configuration of the preferred embodiment implemented in a "pull-pull" configuration using gears, its operation will now be described. FIG. 20 illustrates events that occur when a truck that is pulling a trailer equipped with this this "pull-pull" suspension assembly 305 has already descended a hill and the trailer has almost completed its decent down an incline or when the trailer hitch is too high. As the suspension assembly 305 begins rolling down the incline, trailing spindle swing arm 313 rotates in the direction of arrow AA about its rear spindle pivot point RSP which causes the central torsion axle shaft 314 connected to it to rotate in the same direction.

The turning of the central torsion axle shaft 314 in in the direction of arrow AA causes the housing of the rear rubber torsion axle assembly 345 that the central torsion axle shaft 314 is mounted in to also rotate in the direction of arrow AA. Because the housing of this the rubber torsion axle assembly 345 is rigidly mounted to the lever 308, the lever 308 also rotates in the direction of arrow AA about lever pivot LP. This rotation of lever 308 causes it to pull the control arm 310 in the direction of arrow BB. This in turn causes the control arm 310 to pull on the forward partial gear 339 and cause it to rotate counterclockwise about forward gear pivot FGP. The counterclockwise rotation of the gear teeth 326 on the of the forward partial gear 339 causes the gear teeth 327 on the rearward partial gear 341 to rotate clockwise in the direction of arrow CC along with the rest of the rearward partial gear 341 about rear gear pivot RGP. The clockwise rotation of the rearward partial gear 341 causes the forward rubber torsion axle assembly 343 mounted to it and its central torsion axle shaft 314 to rotate in the clockwise direction of arrow CC. The clockwise rotation of the central torsion axle shaft 314 causes the forward spindle swing arm 312 to rotate about its forward spindle pivot FSP in the same direction of arrow CC. These rotations allow the forward rubber torsion axle assembly to begin to react to some of the load being experienced by the rear rubber torsion axle assembly 345. The linkage of the lever 308 and the forward partial gear 339 through the control arm 310 and the resulting movements of other suspension assembly components provides equalization of the loads imposed on the springs in both rubber torsion axle assemblies 343, 345 and theoretically allows for twice the deflection for a given input load for each spindle swing arm 312, 313.

Figure 21:
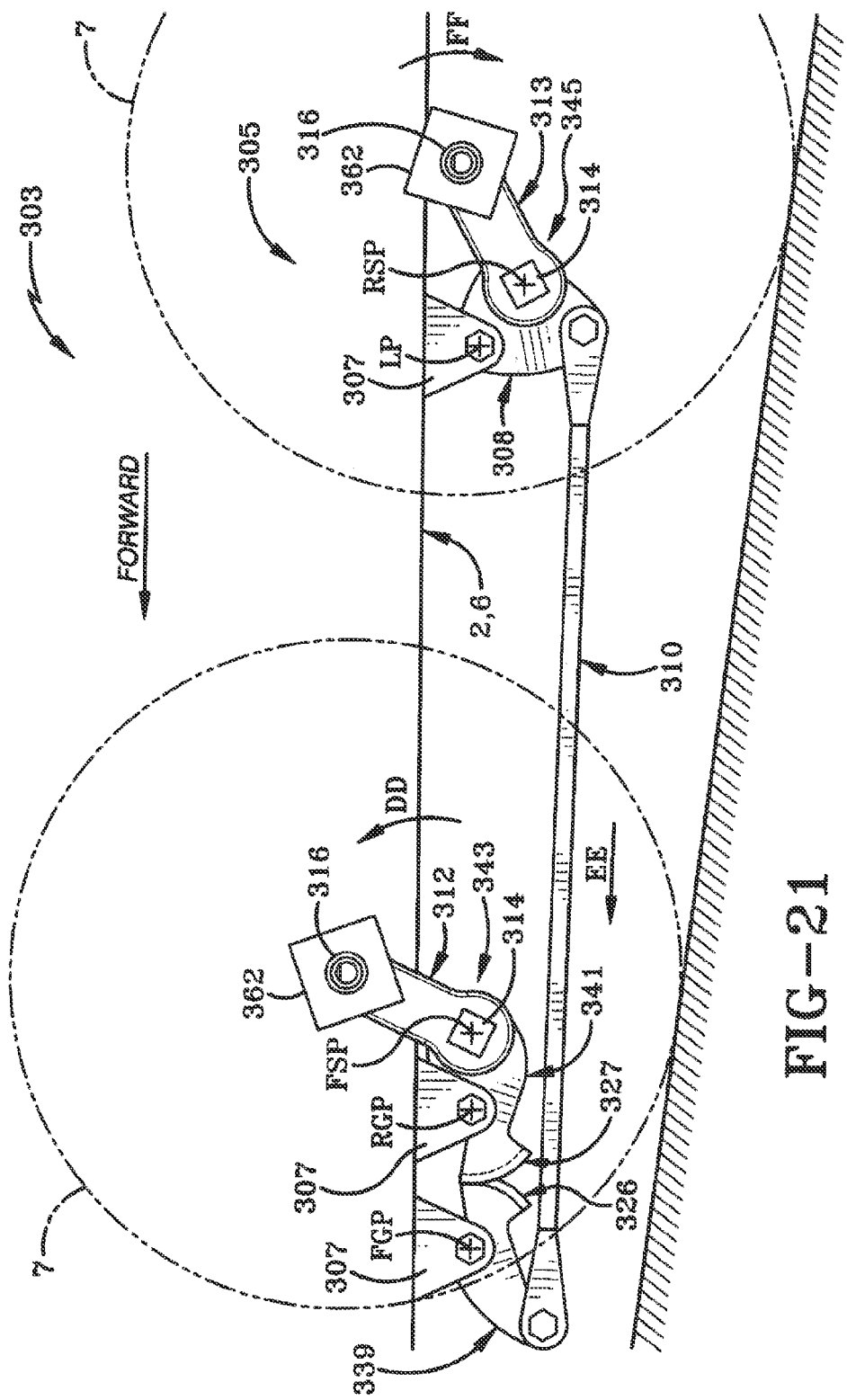
FIG. 21 illustrates the example "pull-pull" suspension of FIG. 17 climbing a hill.

FIG. 21 illustrates an example view of when a truck pulling this configuration of the suspension assembly 305 with gears has already passed over a summit of a hill and a trailer the suspension assembly 305 it is attached to is approaching the summit after traveling up a long incline or the situation when the trailer hitch is too low. The following explanation is generally the same for when a wheel 7 attached to the leading spindle swing arm 312 encounters or rolls over a bump in a surface. When the front wheel 7 attached to the leading spindle swing arm 312 begins to reach the summit, the weight of the trailer causes the forward spindle swing arm 312 to rotate in the direction of arrow DD. This causes two primary events. First, rotating the forward spindle swing arm 312 in the direction of arrow DD causes it to pivot a central torsion axle shaft 314 connected in a similar direction about forward spindle pivot FSP so that the forward rubber torsion axle assembly 343 can begin absorbing some of the forces of the suspension system 303. Rotating the central torsion axle shaft 314 in this direction causes the outer housing of the forward rubber torsion axle assembly 343 that the central torsion axle shaft 314 is housed in to also rotate in the direction of arrow DD about rear gear pivot RGP. The counter clockwise rotation of the rear partial gear 341 in the direction of arrow DD causes the forward partial gear 339 to rotate clockwise. This clockwise rotational movement also causes the control arm 310 pivotally attached to the forward partial gear 339 to move in the direction of arrow EE. This movement of the control arm 310 in turn causes the lever 308 attached to spindle swing arm 313 to rotate in the direction of arrow FF along with its rear rubber torsion axle assembly 345 to force its wheel 7 downward toward the road surface. The rotation of rear spindle swing arm 313 and its central torsion axle shaft 314 causes the rear rubber torsion axle assembly 345 to begin to respond to forces experienced at the leading rubber torsion axle assembly 343 so that both torsion axle assemblies 343, 345 respond to the forces in tandem.

Figure 22:
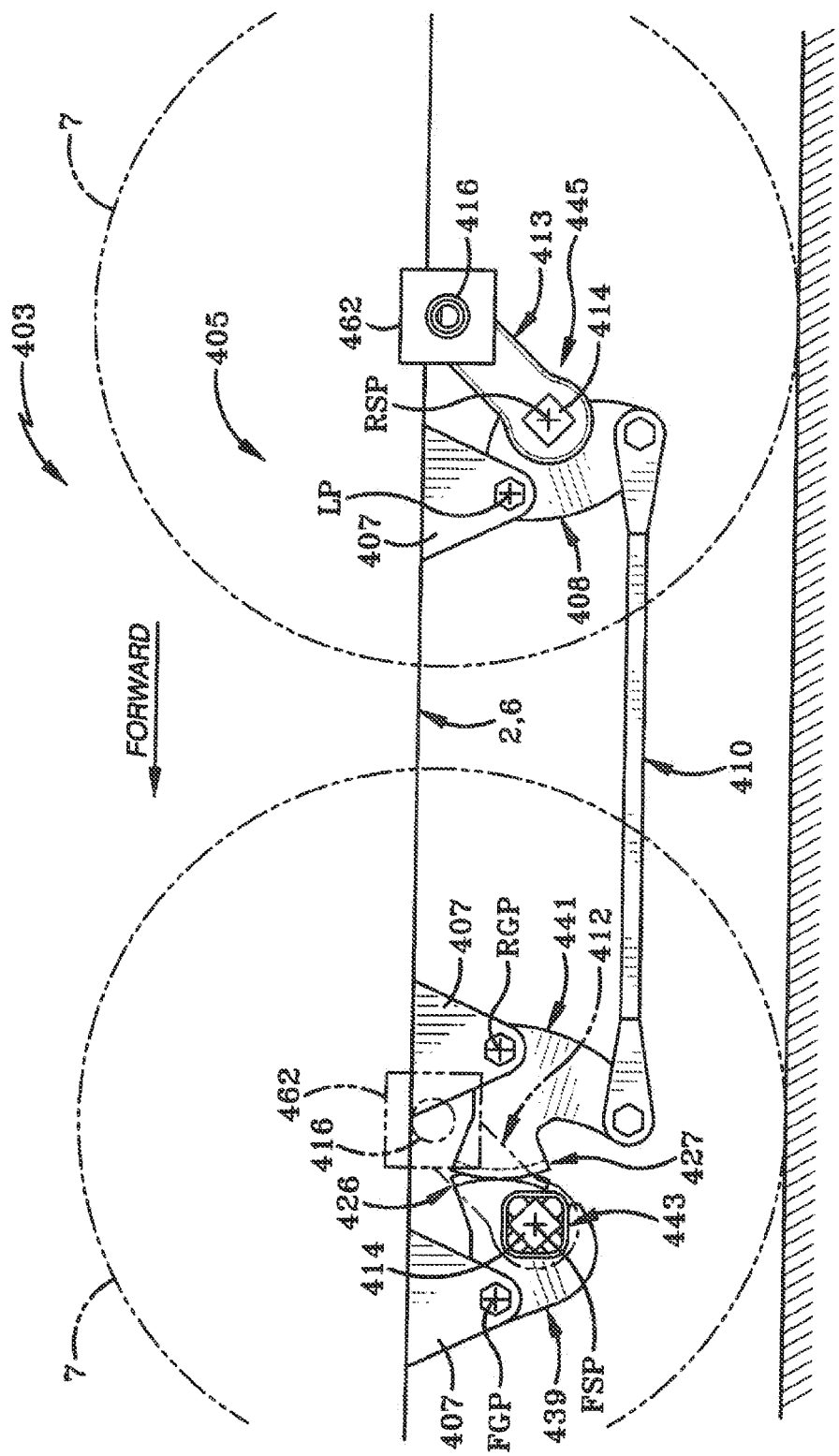
FIG. 22 illustrates a second example "pull-pull" suspension implemented using partial gears.
Figure 23:
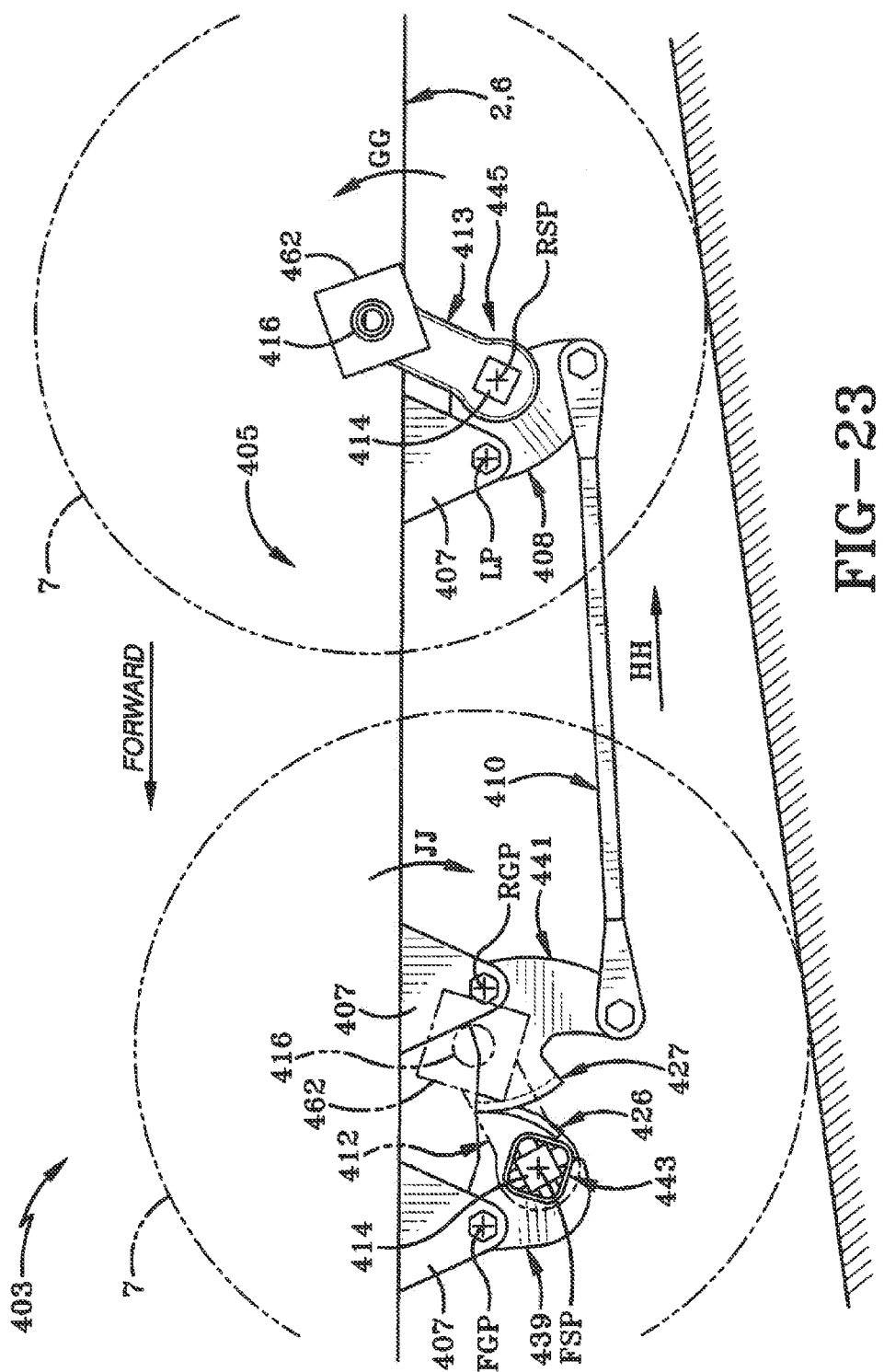
FIG. 23 illustrates the second example "pull-pull" suspension of FIG. 22 descending a hill.
Figure 24:
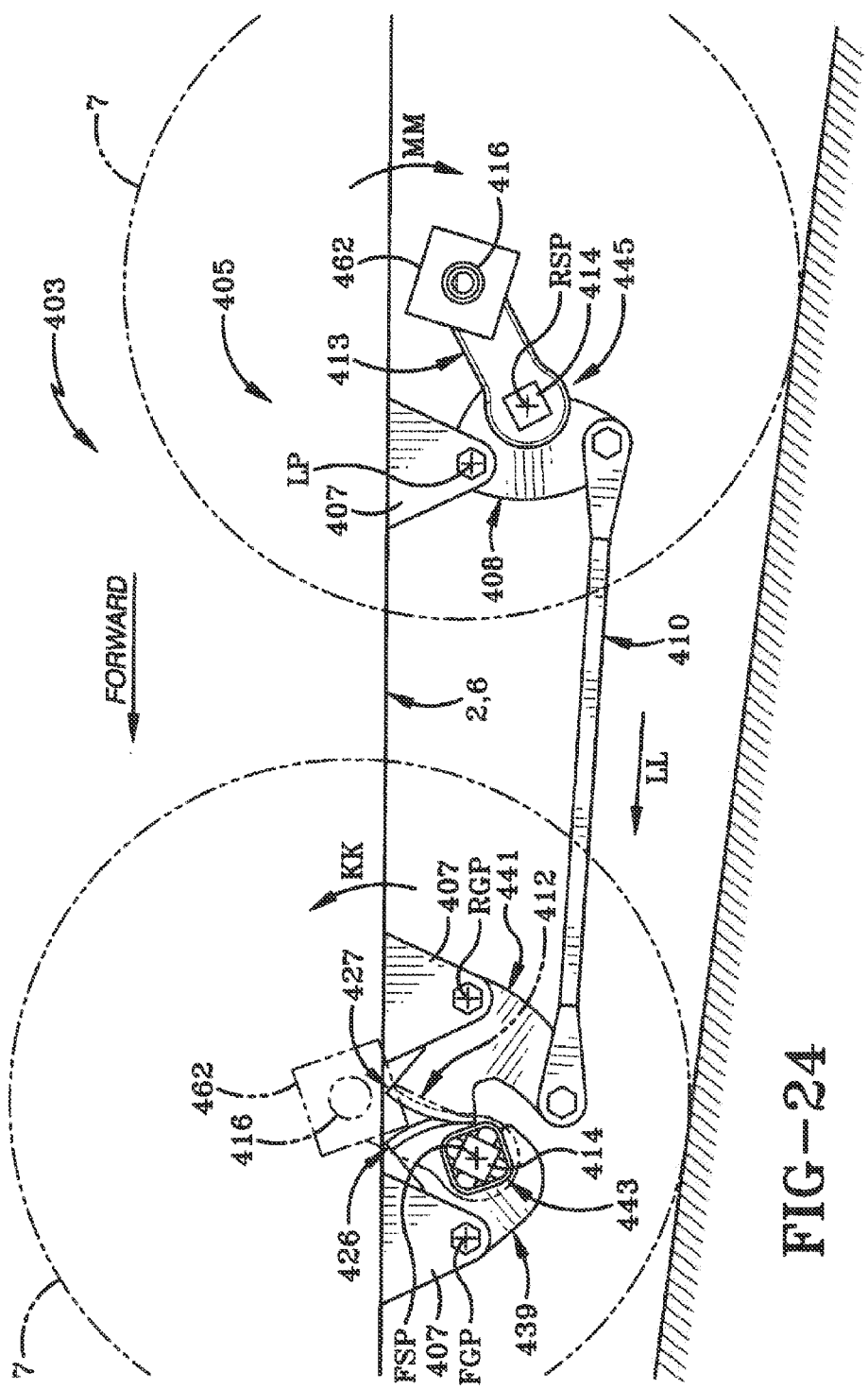
FIG. 24 illustrates the second example "pull-pull" suspension of FIG. 22 climbing a hill.

FIGS. 22-24 illustrate an example second configuration of the preferred embodiment implemented in a "pull-pull" configuration using gears. This second configuration of a "pull-pull" suspension is similar to the "pull-pull" configuration of FIGS. 17-21 except, as discuss further below, it has a forward rubber torsion axle assembly with its spindle swing arm mounted to a forward partial gear rather than the rearward partial gear as was illustrated in FIG. 17-21. In the second configuration of FIGS. 22-24, pivot brackets 407 are mounted to the frame 6 of a trailer 2. However, the pivot brackets 407 could first be mounted to a frame mounting bracket similar to the frame mounting bracket 18 discussed above and then the frame mounting bracket is mounted to the trailer 2. A lever 408 similar to levers 8 discussed earlier is pivotally connected to the rear most pivot bracket 407 so that it pivots about a lever pivot point LP. Another end of the lever 408 is pivotally connected to a control arm 410. A rear rubber torsion axle assembly 445 similar to the torsion axle assemblies 4 discussed above is rigidly mounted to the lever 408 and a rear spindle swing arm 413 is attached to the central torsion axle shaft 414 of the rear rubber torsion axle assembly 445 mounted to the lever 408.

A forward partial gear 439 is pivotally connected to the forward most pivot bracket 407 so that it can pivot about a forward gear pivot FGP and a rearward partial gear 441 is pivotally connected to the middle pivot bracket 407 so that it can pivot about a rear gear pivot RGP. A forward rubber torsion axle assembly 443 is rigidly attached to the forward partial gear 439. A forward spindle swing arm 412 is attached to the central torsion axle shaft 414 of the forward rubber torsion axle assembly 443 and a brake mount 462 and a spindle 416 are mounted on the far end of the forward spindle swing arm 412. One end of the rear partial gear 441 is pivotally connected to one end of the control arm 410.

One end of the forward partial gear 439 is formed with gear teeth 426. When the suspension assembly 405 is assembled, the gear teeth 426 of the forward partial gear 439 interlace with gear teeth 427 formed at one end of the rearward partial gear 441. As discussed above with reference to FIGS. 18 and 19 the teeth 426 of the forward partial gear 439 can be interlocked with the teeth 427 of the rearward partial gear 441.

Having described the components of the example second configuration of the preferred embodiment implemented in a "pull-pull" configuration using gears, its operation will now be described. FIG. 23 illustrates events that occur when a truck that is pulling a trailer equipped with this this "pull-pull" suspension assembly 405 has already descended a hill and the trailer has almost completed its decent down an incline or when the trailer hitch is too high. As the suspension assembly 405 begins rolling down the incline, trailing spindle swing arm 413 rotates in the direction of arrow GG about its rear spindle pivot point RSP which causes the central torsion axle shaft 414 connected to it to rotate in the same direction. The turning of the central torsion axle shaft 414 in the direction of arrow GG in turns causes the housing of the rear rubber torsion axle assembly 445 that the central torsion axle shaft 414 is mounted in to also rotate in the direction of arrow GG. Because the housing of this the rubber torsion axle assembly 445 is rigidly mounted to the lever 408, the lever 408 also rotates in the direction of arrow GG about lever pivot LP. This rotation of lever 408 causes it to pull the control arm 410 in the direction of arrow HH. This in turn causes the control arm 410 to pull on the rear partial gear 441 and cause it to rotate counterclockwise about rear gear pivot RGP. The counterclockwise rotation of the gear teeth 427 on the of the rear partial gear 441 causes the gear teeth 426 on the forward partial gear 439 to rotate clockwise in the direction of arrow JJ along with the rest of the forward partial gear 439 about forward gear pivot FGP. The clockwise rotation of the forward partial gear 439 causes the forward rubber torsion axle assembly 443 mounted to it and its central torsion axle shaft 414 to rotate in the clockwise direction of arrow JJ. The clockwise rotation of the central torsion axle shaft 414 rotates the forward spindle swing arm 412 in the same direction about its forward spindle pivot FSP so that the forward rubber torsion axle assembly 443 can begin to react to some of the load being experienced by the rear rubber torsion axle assembly 445. The linkage of the lever 408 and the rearward partial gear 441 through the control arm 410 and the resulting movement of other suspension assembly components provides equalization of the loads imposed on the springs in both rubber torsion axle assemblies 443, 445 and theoretically allows for twice the deflection for a given input load for each spindle swing arm 412, 413.

FIG. 24 illustrates an example view of when a truck pulling this configuration of the suspension assembly 405 with gears has already passed over a summit of a hill and a trailer the suspension assembly 405 it is attached to is approaching the summit after traveling up a long incline or the situation when the trailer hitch is too low. The following explanation is generally the same for when a wheel 7 attached to the leading spindle swing arm 412 encounters or rolls over a bump in a surface. When the front wheel 7 attached to the leading spindle swing arm 412 begins to reach the summit, the weight of the trailer causes the forward spindle swing arm 412 to rotate in the direction of arrow KK. This causes two primary events. First, the spindle swing arm 412 rotates about forward spindle pivot FSP in the direction of arrow KK causing it to pivot a central torsion axle shaft 414 connected to it in the direction of arrow KK. Rotating the central torsion axle shaft 414 in this direction causes the outer housing of the forward rubber torsion axle assembly 443 that the central torsion axle shaft 414 is housed in and the forward partial gear 439 to also rotate in the direction of arrow KK about forward gear pivot FGP. The counter clockwise rotation of the forward partial gear 439 in the direction of arrow KK causes the rearward partial gear 441 to rotate clockwise. This clockwise rotational movement also causes, through the control arm 410 attached to the reward partial gear 441 to move in the direction of arrow LL. This movement of the control arm 410 in turn causes the lever 408 attached to rear rubber torsion axle assembly 445 to rotate in the direction of arrow MM along with its central torsion axle shaft 414 and rear spindle swing arm 413 to force its wheel 7 downward toward the road surface. The rotation of rear spindle swing arm 413 and its central torsion axle shaft 414 about rear spindle pivot RSP causes the rear rubber torsion axle assembly 445 to begin to respond to forces experienced at the leading torsion axle assembly 443 so that both torsion axle assemblies 443, 445 respond to the forces in tandem.

Figure 25:
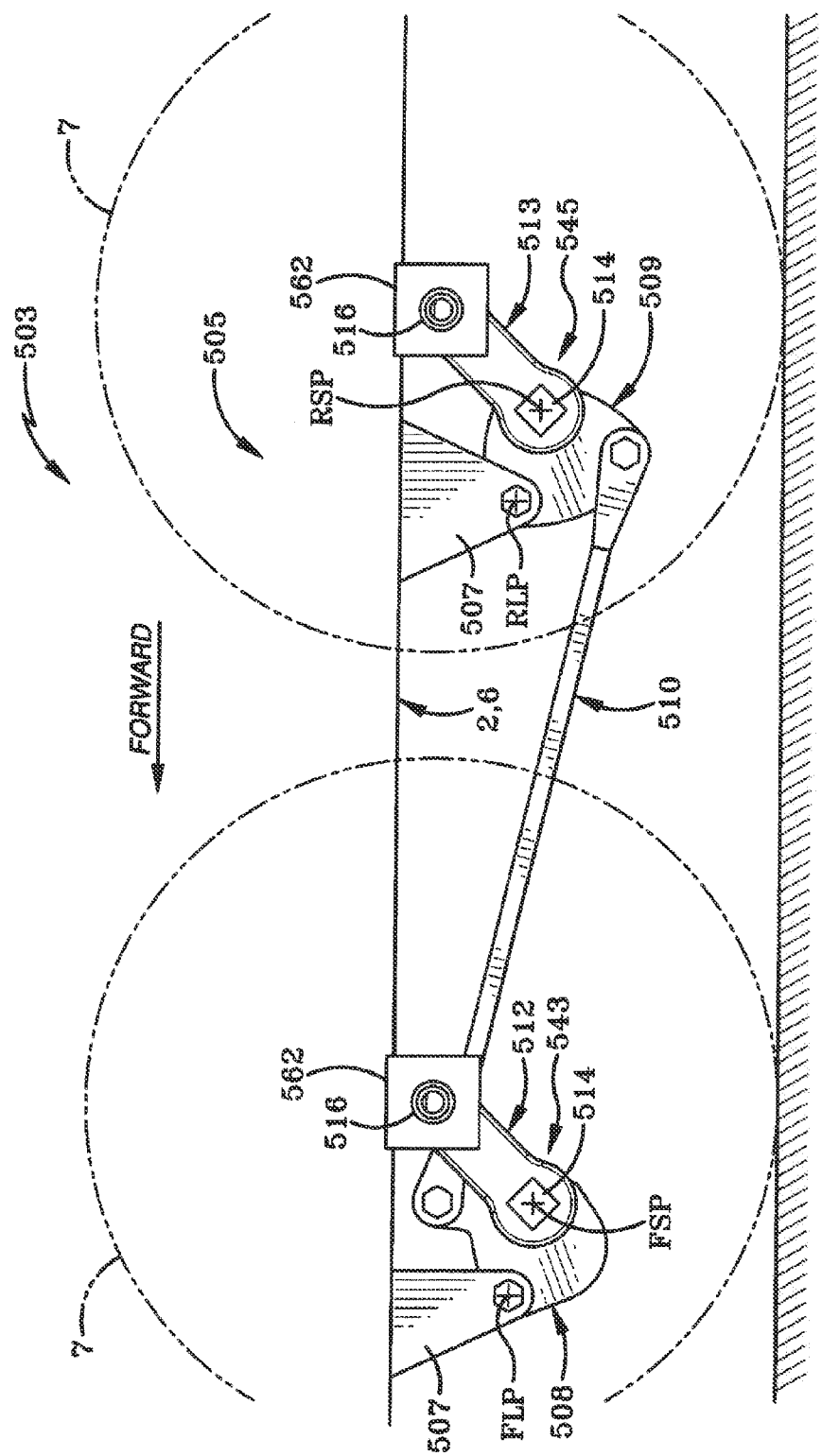
FIG. 25 illustrates a third example "pull-pull" suspension using two levers and a control arm.
Figure 26:
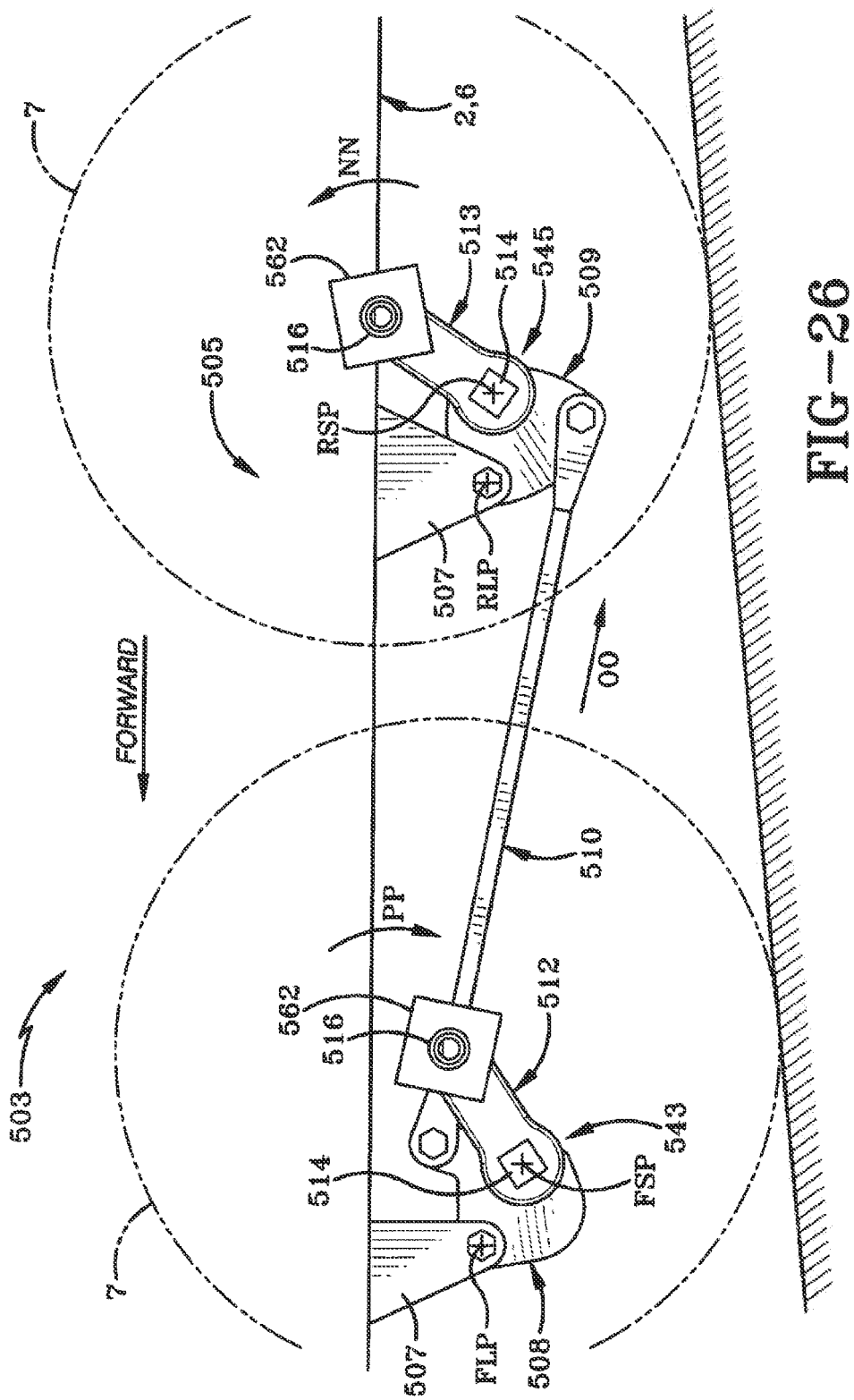
FIG. 26 illustrates the third example "pull-pull" suspension of FIG. 22 descending a hill.
Figure 27:
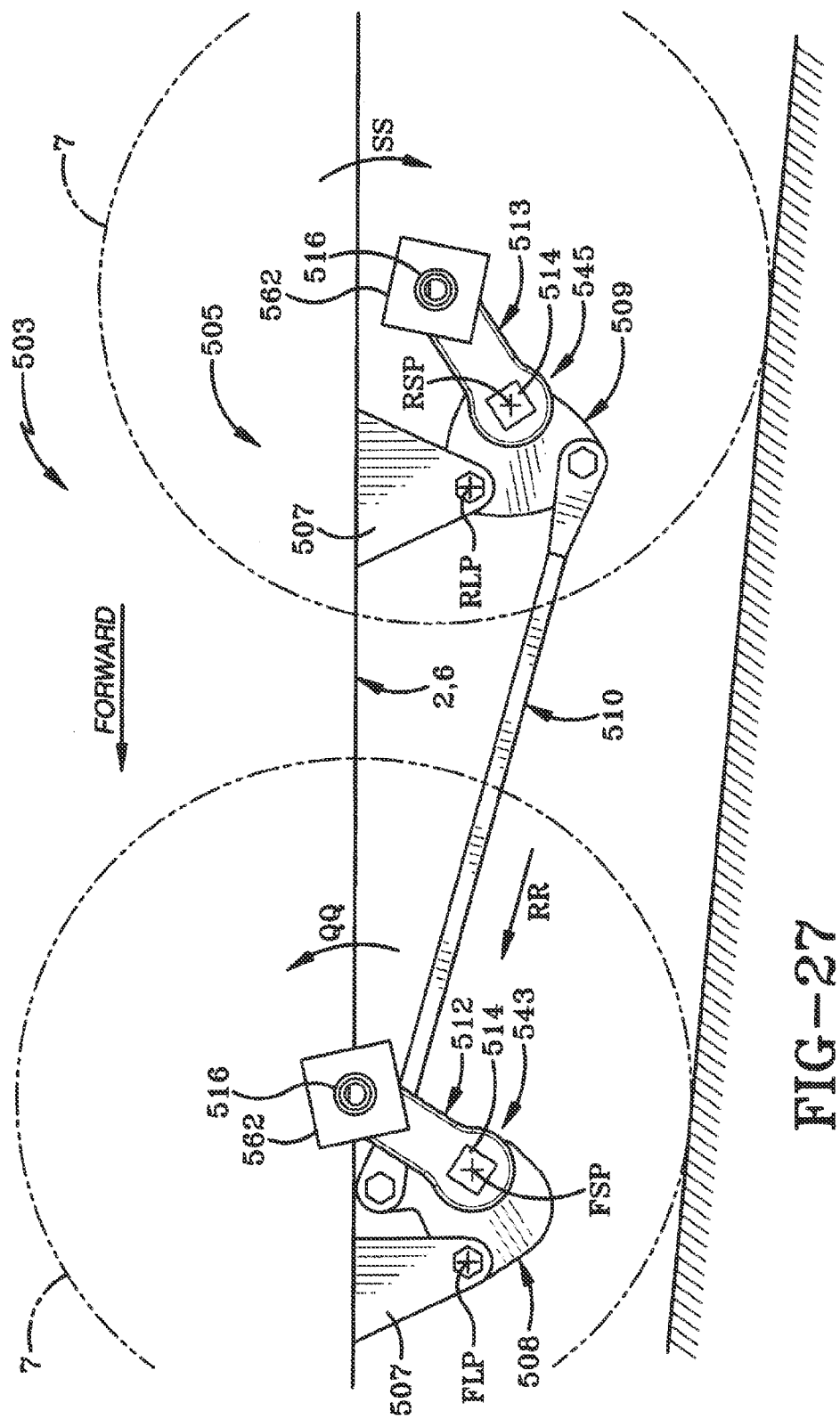
FIG. 27 illustrates the third example "pull-pull" suspension of FIG. 22 climbing a hill.

FIGS. 25-27 illustrate an example configuration of the preferred embodiment implemented in a "pull-pull" configuration using two levers. In this configuration, pivot brackets 507 are mounted to the frame 6 of a trailer 2. However, the pivot brackets 507 could first be mounted to a frame mounting bracket similar to the frame mounting bracket 18 discussed above and then the frame mounting bracket is mounted to the trailer 2. A forward lever 508 similar to levers 8 discussed earlier is pivotally connected to the forward most pivot bracket 507 so that it pivots about a front lever pivot point FLP. The other end of the front lever 508 is pivotally connected to a control arm 510. A front rubber torsion axle assembly 543 similar to the torsion axle assemblies 4 discussed above is rigidly mounted to the front lever 508 and a front spindle swing arm 512 is attached to the central torsion axle shaft 514 of the front rubber torsion axle assembly 543 mounted to the front lever 508. A brake mount 562 and spindle 516 are mounted to the other end of the forward spindle swing arm 512.

A rear lever 509 is pivotally connected to the rear most pivot bracket 507 so that it pivots about a rear lever pivot point RLP. The other end of the rear lever 509 is pivotally connected to the control arm 510. A rear rubber torsion axle assembly 545 similar to the torsion axle assemblies 4 discussed above is rigidly mounted to the rear lever 509 and a rear spindle swing arm 513 is attached to the central torsion axle shaft 514 of the rear rubber torsion axle assembly 543 mounted to the rear lever 509. Both of the forward spindle swing arm 512 and the rear spindle swing arm 513 are generally parallel and pointing rearward from their attachment points to their respective central torsion axle shafts 514.

Having described the components of this example configuration of a "pull-pull" configuration using two levers, its operation will now be described. FIG. 26 illustrates events that occur when a truck that is pulling a trailer equipped with this this "pull-pull" suspension assembly 505 has already descended a hill and the trailer has almost completed its decent down an incline or when the trailer hitch is too high. As the suspension assembly 505 begins rolling down the incline, trailing spindle swing arm 513 rotates in the direction of arrow NN about its rear spindle pivot point RSP which causes the central torsion axle shaft 514 connected to it to rotate in the same direction. The turning of the central torsion axle shaft 514 in the direction of arrow NN in turns causes the housing of the rear rubber torsion axle assembly 545 that the central torsion axle shaft 514 is mounted in to also rotate in the direction of arrow NN. Because the housing of this rear rubber torsion axle assembly 545 is rigidly mounted to the lever 509, the lever 509 also rotates in the direction of arrow NN about rear lever pivot RLP. This rotation of rear lever 509 causes it to pull the control arm 510 in the direction of arrow 00. This in turn causes the control arm 510 to pull on the forward lever 508 and cause it to rotate clockwise about forward lever pivot FLP in the direction of arrow PP. The clockwise rotation in the direction of arrow PP of the forward lever 508 causes the forward rubber torsion axle assembly 543 and its central torsion axle shaft 514 mounted in it to also rotate in the clockwise direction of arrow PP. The clockwise rotation of the central torsion axle shaft 514 rotates the forward spindle swing arm 512 in the same direction about its forward spindle pivot FSP so that the forward rubber torsion axle assembly 543 can begin to react to some of the load being experienced by the rear rubber torsion axle assembly 545. The linkage of the front lever 508 and the rear lever 509 through the control arm 510 and the resulting movement of other suspension assembly components provides equalization of the loads imposed on the springs in both rubber torsion axle assemblies 543, 545 and theoretically allows for twice the deflection for a given input load for each spindle swing arm 512, 513.

FIG. 27 illustrates an example view of when a truck pulling this configuration of the suspension assembly 505 with gears has already passed over a summit of a hill and a trailer the suspension assembly 505 it is attached to is approaching the summit after traveling up a long incline or the situation when the trailer hitch is too low. The following explanation is generally the same for when a wheel 7 attached to the leading spindle swing arm 512 encounters or rolls over a bump in a surface. When the front wheel 7 attached to the leading spindle swing arm 512 begins to reach the summit, the weight of the trailer causes the forward spindle swing arm 512 to rotate in the direction of arrow QQ. This causes two primary events. First, the spindle swing arm 512 rotates about forward spindle pivot FSP in the direction of arrow QQ causing it to pivot a central torsion axle shaft 514 connected to it in the direction of arrow QQ. Rotating the central torsion axle shaft 514 in this direction causes the outer housing of the forward rubber torsion axle assembly 543 that the central torsion axle shaft 514 is housed in and the forward lever 508 to also rotate in the direction of arrow QQ about forward lever pivot FLP. The counter clockwise rotation of the forward lever 508 in the direction of arrow QQ causes the control arm 510 to move in the direction of arrow RR. This movement of the control arm 510 in turn causes the rear lever 509 attached to rear rubber torsion axle assembly 545 and it central torsion axle shaft 514 to rotate in the direction of arrow SS. Rotating the central torsion axle shaft 514 of the rear rubber torsion axle assembly 545 in the direction of arrow SS causes the spindle swing arm 513 attached to it to force its wheel 7 downward toward the surface. This causes the rear rubber torsion axle assembly 545 to begin to respond to forces experienced at the leading torsion axle assembly 543 so that both torsion axle assemblies 543, 545 respond to the forces in tandem.

Figure 28:
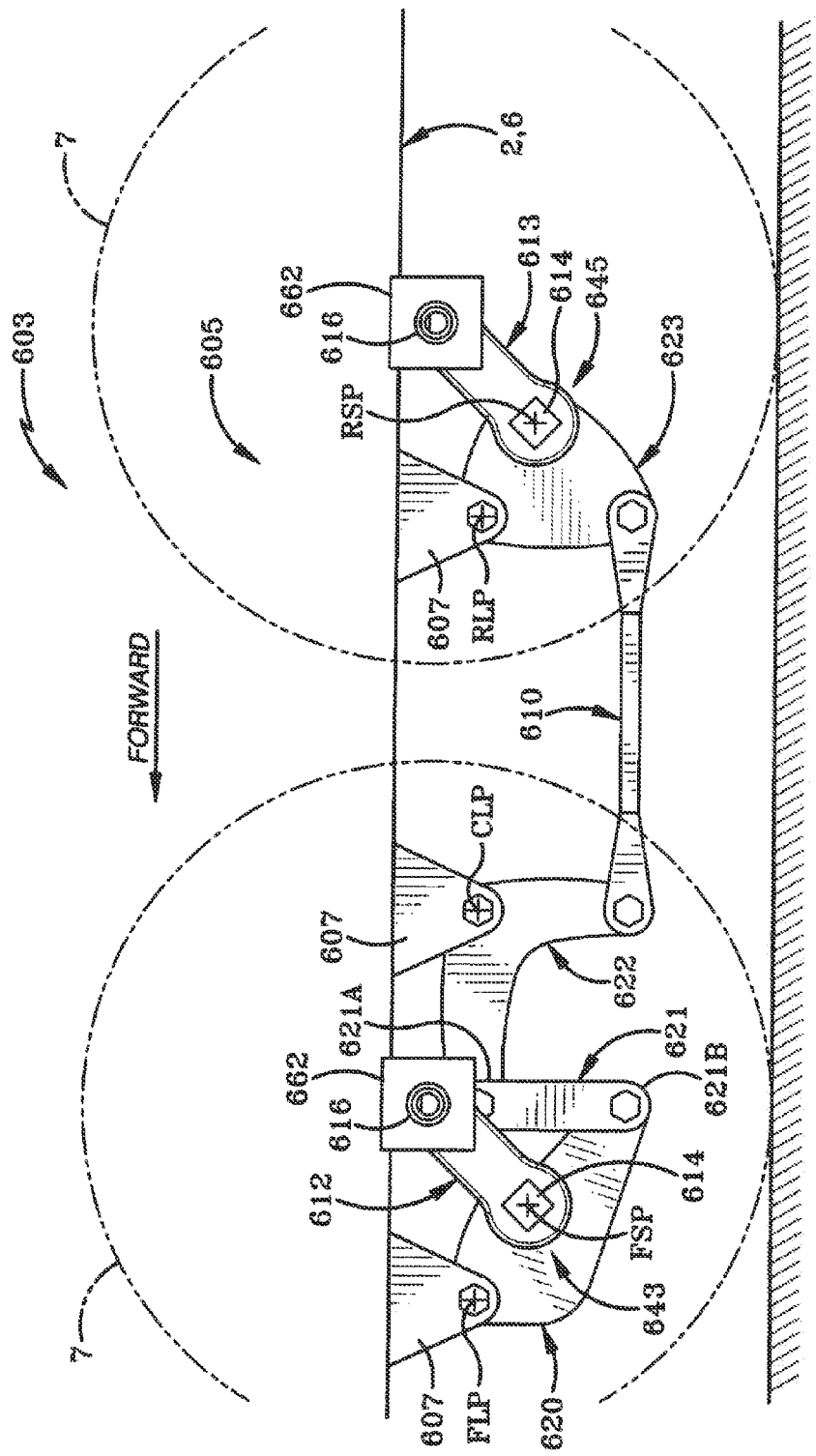
FIG. 28 illustrates a third example "pull-pull" suspension using three levers and two control arms.
Figure 29:
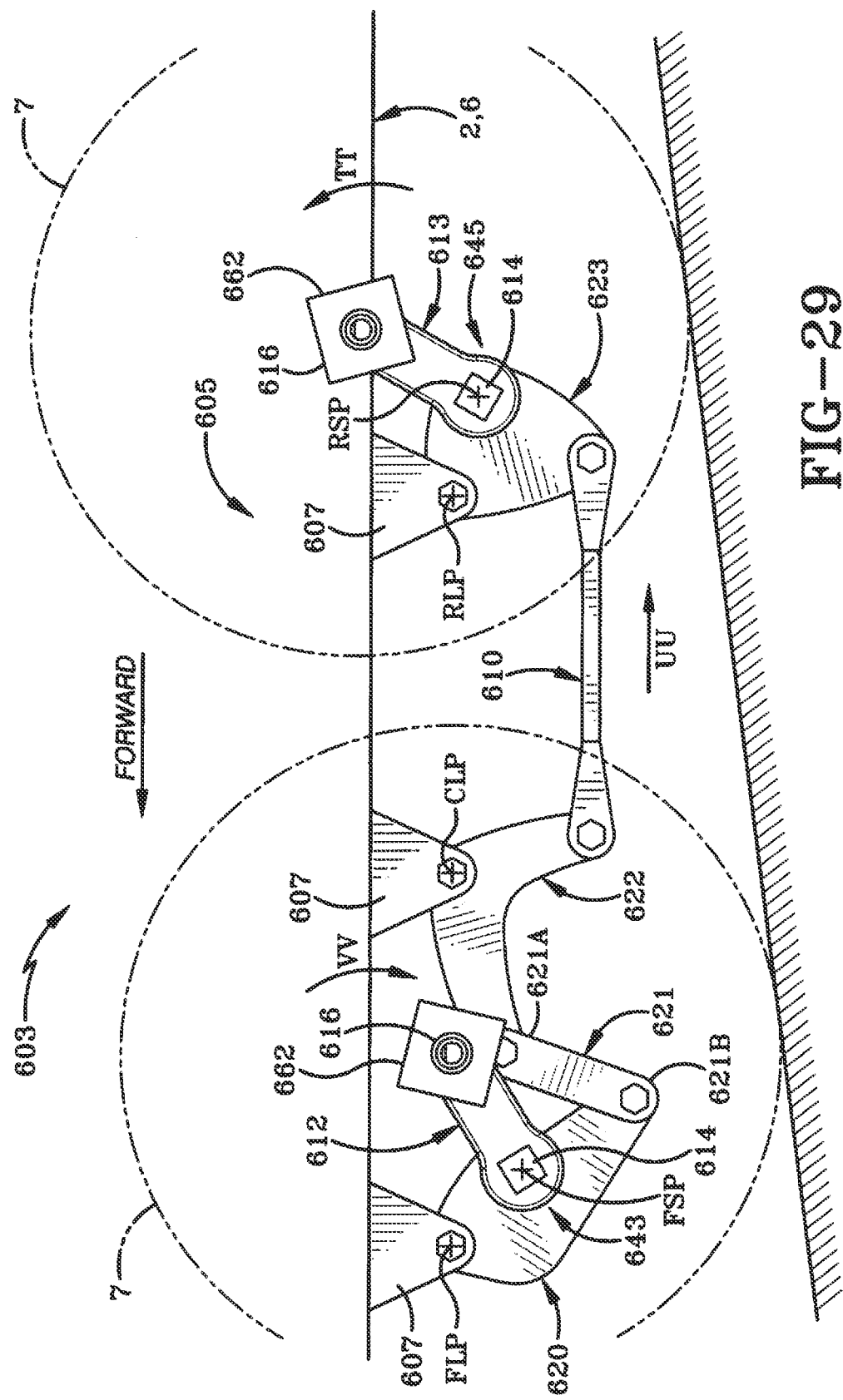
FIG. 29 illustrates the third example "pull-pull" suspension of FIG. 22 descending a hill.

FIGS. 28-30 illustrate an example configuration of the preferred embodiment implemented in a "pull-pull" configuration using at least three levers. In this configuration, pivot brackets 607 are mounted to the frame 6 of a trailer 2. However, the pivot brackets 607 could first be mounted to a frame mounting bracket similar to the frame mounting bracket 18 discussed above and then the frame mounting bracket is mounted to the trailer 2. A forward lever 620 is pivotally connected to the forward most pivot bracket 607 so that it pivots about a front lever pivot point FLP. The other end of the front lever 620 is pivotally connected to one end 621B of an elongated lever connecting bar 621. A front rubber torsion axle assembly 643 similar to the torsion axle assemblies 4 discussed above is rigidly mounted in the front lever 620 and a front spindle swing arm 612 is attached to the central torsion axle shaft 614 of the front rubber torsion axle assembly 643 mounted to the front lever 620. A brake mount 662 and spindle 616 are mounted to the other end of the forward spindle swing arm 612.

The other end of the lever connecting bar 621A is connected to one end of a central lever 622. The central lever 622 is pivotally connected to a central pivot bracket 607 so that it pivots about central lever pivot point CLP. The central pivot bracket is between the forward most pivot bracket 607 and the rearmost pivot bracket 207. The other end of the central lever 622 is pivotally connected to one end of a control arm 610.

A rear lever 623 is pivotally connected to the rear most pivot bracket 607 so that it pivots about a rear lever pivot point RLP. The other end of the rear lever 623 is pivotally connected to the control arm 610. A rear rubber torsion axle assembly 645 similar to the torsion axle assemblies 4 discussed above is rigidly mounted in the rear lever 623 and a rear spindle swing arm 613 is attached to the central torsion axle shaft 614 of the rear rubber torsion axle assembly 643 mounted to the rear lever 623. Both of the forward spindle swing arm 612 and the rear spindle swing arm 613 are generally parallel and pointing rearward from their attachment points to their respective central torsion axle shafts 614 when they are in a static no load condition.

Having described the components of this example configuration of a "pull-pull" configuration using at least three levers, its operation will now be described. FIG. 29 illustrates events that occur when a truck that is pulling a trailer equipped with this this "pull-pull" suspension assembly 605 has already descended a hill and the trailer has almost completed its decent down an incline or when the trailer hitch is too high. As the suspension assembly 605 begins rolling down the incline, trailing spindle swing arm 613 rotates in the direction of arrow TT about its rear spindle pivot point RSP which causes the central torsion axle shaft 614 connected to it to rotate in the same direction. The turning of the central torsion axle shaft 614 in the direction of arrow TT in turns causes the housing of the rear rubber torsion axle assembly 645 that the central torsion axle shaft 614 is mounted in to also rotate in the direction of arrow TT. Because the housing of this rear rubber torsion axle assembly 645 is rigidly mounted to the rear lever 623, the lever 623 also rotates in the direction of arrow TT about rear lever pivot RLP. This rotation of rear lever 623 causes it to pull the control arm 610 in the direction of arrow UU. This in turn causes the control arm 610 to pull on the central lever 622 and cause it to rotate counterclockwise about central lever pivot CLP. The counterclockwise rotation the central lever 622 causes it to move one end 621A of the lever connecting bar 621 it is connected to in a downward direction. Moving that end 621A of the lever connecting bar 621 in a downward direction causes the other end 621B to rotate the first lever 620 in a clockwise direction as indicated by arrow VV.

The rotation of the first lever 620 in a clockwise direction as indicated by arrow W causes the forward rubber torsion axle assembly 643 and its central torsion axle shaft 614 mounted to it to also rotate in the clockwise direction of arrow W. The clockwise rotation of the central torsion axle shaft 614 rotates the forward spindle swing arm 612 in the same direction about its forward spindle pivot FSP so that the forward rubber torsion axle assembly can begin to react to some of the load being experienced by the rear rubber torsion axle assembly 645. The linkage of the front lever 620, central lever, 622, and the rear lever 623 through the control arm 610 and lever connecting bar 621 as well as the resulting movement of other suspension assembly components provides equalization of the loads imposed on the springs in both rubber torsion axle assemblies 643, 645 and theoretically allows for twice the deflection for a given input load for each spindle swing arm 612, 613.

FIG. 30 illustrates an example view of when a truck pulling this configuration of the suspension assembly 605 with three levers has already passed over a summit of a hill and a trailer the suspension assembly 605 it is attached to is approaching the summit after traveling up a long incline or the situation when the trailer hitch is too low. The following explanation is generally the same for when a wheel 7 attached to the leading spindle swing arm 612 encounters or rolls over a bump in a surface. When the front wheel 7 attached to the leading spindle swing arm 612 begins to reach the summit, the weight of the trailer causes the forward spindle swing arm 612 to rotate in the direction of arrow WW. This causes two primary events. First, the spindle swing arm 612 rotates about forward spindle pivot FSP in the direction of arrow WW causing it to pivot a central torsion axle shaft 614 connected to it in the direction of arrow WW. Rotating the central torsion axle shaft 614 in this direction causes the outer housing of the forward rubber torsion axle assembly 643 that the central torsion axle shaft 614 is housed in and the forward lever 620 to also rotate in the direction of arrow WW about forward lever pivot FLP. The counter clockwise rotation of the forward lever 620 in the direction of arrow WW causes the forward lever 620 to push one end 621B of the lever connecting bar in an upward direction. This causes the other end 621A of the lever connecting bar to rotate the central lever 622 a clockwise direction.

The clockwise rotation of the central lever 622 causes it to pull the control arm 610 in the direction of arrow XX. This movement of the control arm 610 in turn causes the rear lever 623 to pivotally rotate about rear lever pivot RLP in the direction of arrow YY along with its rear rubber torsion axle assembly 645. Rotating the rear rubber torsion axle assembly 645 causes its torsion axle shaft 614 to rotate in the same direction along with rear spindle swing arm 613 about rear spindle pivot RSP and to force its wheel 7 downward onto a road surface. These rotations cause the rear rubber torsion axle assembly 645 to begin to respond to forces experienced at the leading torsion axle assembly 643 so that both torsion axle assemblies 643, 645 respond to the forces in tandem.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1600 illustrates a method 1600 of reacting to loads encountered by a vehicle. The method 1600 begins by rotating a first rubber torsion axle assembly a first amount of rotation, at 1602, in response to the load. For example, a wheel connected to a spindle can roll over a bump or into a hole and this moves the spindle swing arm that the spindle is connected to up or down. Because the other end of the spindle swing arm is connected to a central torsion axle shaft of a torsion axle, it will eventually rotate the first rubber torsion axle assembly connected to the spindle swing arm as the rubber springs in the torsion axle become compressed.

The method 1600 next rotates a second rubber torsion axle assembly a second rotation amount, at 1604. The second amount of rotation can be directly proportional to the first amount of rotation. Additionally, the first rubber torsion axle assembly and the second rubber torsion axle assembly are rotated simultaneously. For example, the second rubber torsion axle assembly can be mounted to a second spindle swing arm. The second swing arm can be connected with levers and a control arm, as discussed above, to cause the second rubber torsion axle assembly to rotate with the first rubber torsion axle assembly. As previously mentioned, the first rubber torsion axle assembly and the second rubber torsion axle assembly can operate in a "push-pull" configuration when one spindle swing arm is leading and one is trailing. Alternatively, the first rubber torsion axle assembly and the second rubber torsion axle assembly can operate in a "pull-pull" configuration when both spindle swing arms are trailing.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A suspension assembly for a vehicle comprising:
   a front rubber torsion axle assembly with an outer housing;
   a front spindle swing arm;
   wherein the front rubber torsion axle assembly further comprises:
      a front central torsion axle shaft;
      front rubber springs, wherein the front rubber springs are located between the outer housing of the front rubber torsion axle assembly and the front central torsion axle shaft;
      wherein the front spindle swing arm is rotatable with the front central torsion axle shaft about a forward spindle pivot;
   a rear rubber torsion axle assembly with an outer housing;
   a rear spindle swing arm;
   wherein the rear rubber torsion axle assembly further comprises:
      a rear central torsion axle shaft;
      rear rubber springs, wherein the rear rubber springs are located between the outer housing of the rear rubber torsion axle assembly and the rear central torsion axle shaft;
      wherein the rear spindle swing arm is rotatably connected to the rear central torsion axle shaft to rotate about a rear spindle pivot;
   a front lever adapted to be pivotally attached to the vehicle at a front lever pivot point, wherein the outer housing of the front rubber torsion axle assembly is rigidly mounted to the front lever;
   a rear lever adapted to be pivotally attached to the vehicle at a rear lever pivot point, wherein the outer housing of the rear rubber torsion axle assembly is rigidly mounted to the rear lever, wherein with respect to a normal forward traveling direction of the vehicle, the front lever is mounted forward of the rear lever;
   a rigid control arm pivotally connected to the front lever at a front control arm pivot point and pivotally connected to the rear lever at a rear control arm pivot point, wherein the suspension assembly is configured so that when the suspension assembly encounters a force causing the front lever to rotate in a front rotational direction about the front lever pivot point, the rigid control arm is configured to cause the rear lever to rotate about the rear lever pivot point in a rear rotational direction that is opposite the front rotational direction; and
   wherein with respect to the normal forward traveling direction of the vehicle, the front lever pivot point is forward of the front control arm pivot point and the forward spindle pivot, and wherein the rear lever pivot point is forward of the rear control arm pivot point and the rear spindle pivot.

2. The suspension assembly of claim 1 wherein when the suspension assembly is in a static no-load condition, the front control arm pivot point is higher than the front lever pivot point and the rear lever pivot point is higher than the rear control arm pivot point.

3. The suspension assembly of claim 1 wherein the forward spindle pivot is lower than the front control arm pivot point.

4. The suspension assembly of claim 1 wherein with respect to the normal forward traveling direction of the vehicle, the front lever extends rearward from the front lever pivot point and the rear lever extends rearward from the rear lever pivot point.

5. The suspension assembly of claim 1 further comprising:
a front wheel assembly mounted to the front spindle swing arm;
a rear wheel assembly mounted to the rear spindle swing arm, wherein when the front wheel assembly moves downward, the rear wheel assembly moves upward.

6. The suspension assembly of claim 5, wherein when the front wheel assembly encounters a force, the front rubber torsion axle assembly reacts to absorb at least some of the force and the rear rubber torsion axle assembly acts in series with the front rubber torsion axle assembly to absorb at least some of the force.

7. The suspension assembly of claim 1 wherein a spring rate of the front rubber torsion axle assembly when cooperating with the rear rubber torsion axle assembly is about half the spring rate of the front rubber torsion axle assembly which would be exhibited without the rear rubber torsion axle assembly cooperating with the front rubber torsion axle assembly.

8. A suspension assembly for a vehicle comprising:
a front rubber torsion axle assembly with an outer housing;
a rear rubber torsion axle assembly with an outer housing;
a front lever adapted to be pivotally attached to the vehicle at a front lever pivot point, wherein the outer housing of the front rubber torsion axle assembly is rigidly mounted to the front lever;
a rear lever adapted to be pivotally attached to the vehicle at a rear lever pivot point, wherein the outer housing of the rear rubber torsion axle assembly is rigidly mounted to the rear lever, wherein with respect to a normal forward traveling direction of the vehicle, the front lever is mounted forward of the rear lever;
a rigid control arm pivotally connected to the front lever at a front control arm pivot point and pivotally connected to the rear lever at a rear control arm pivot point, wherein the suspension assembly is configured so that when the suspension assembly encounters a force causing the front lever to rotate in a front rotational direction about the front lever pivot point, the rigid control arm is configured to cause the rear lever to rotate about the rear lever pivot point in a rear rotational direction that is opposite the front rotational direction; and
wherein with respect to the normal forward traveling direction of the vehicle, the front lever extends rearward from the front lever pivot point and the rear lever extends rearward from the rear lever pivot point.

9. The suspension assembly of claim 8 further comprising:
a front spindle swing arm, and wherein the front rubber torsion axle assembly further comprises:
a front central torsion axle shaft;
front rubber springs, wherein the front rubber springs are located between the outer housing of the front rubber torsion axle assembly and the front central torsion axle shaft; and wherein the front spindle swing arm is rotatable with the front central torsion axle shaft about a forward spindle pivot.

10. The suspension assembly of claim 9 wherein the forward spindle pivot is lower than the front control arm pivot point.

11. The suspension assembly of claim 9 further comprising:
a rear spindle swing arm, and wherein the rear rubber torsion axle assembly further comprises:
a rear central torsion axle shaft;
rear rubber springs, wherein the rear rubber springs are located between the outer housing of the rear rubber torsion axle assembly and the rear central torsion axle shaft; and
wherein the rear spindle swing arm is rotatably connected to the rear central torsion axle shaft to rotate about a rear spindle pivot.

12. The suspension assembly of claim 11 wherein with respect to the normal forward traveling direction of the vehicle, the front lever pivot point is forward of the front control arm pivot point and the forward spindle pivot, and wherein the rear lever pivot point is forward of the rear control arm pivot point and the rear spindle pivot.

13. The suspension assembly of claim 8 wherein when the suspension assembly is in a static no-load condition, the front control arm pivot point is higher than the front lever pivot point and the rear lever pivot point is higher than the rear control arm pivot point.

14. The suspension assembly of claim 8 further comprising:
a front spindle swing arm mounted to the front rubber torsion axle assembly;
a front wheel assembly mounted to the front spindle swing arm;
a rear spindle swing arm mounted to the rear rubber torsion axle assembly;
a rear wheel assembly mounted to the rear spindle swing arm, wherein when the front wheel assembly moves downward, the rear wheel assembly moves upward.

15. The suspension assembly of claim 14, wherein when the front wheel assembly encounters a force, the front rubber torsion axle assembly reacts to absorb at least some of the force and the rear rubber torsion axle assembly acts in series with the front rubber torsion axle assembly to absorb at least some of the force.

16. The suspension assembly of claim 8 wherein a spring rate of the front rubber torsion axle assembly when cooperating with the rear rubber torsion axle assembly is about half the spring rate of the front rubber torsion axle assembly which would be exhibited without the rear rubber torsion axle assembly cooperating with the front rubber torsion axle assembly.

* * * * *